US012538087B2

(12) United States Patent
Zhang et al.

(10) Patent No.: US 12,538,087 B2
(45) Date of Patent: Jan. 27, 2026

(54) EFFICIENT MODELING OF FILTERS

(71) Applicant: Telefonaktiebolaget LM Ericsson (publ), Stockholm (SE)

(72) Inventors: Mengqiu Zhang, Stockholm (SE); Erlendur Karlsson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 146 days.

(21) Appl. No.: 18/690,503

(22) PCT Filed: Sep. 7, 2022

(86) PCT No.: PCT/EP2022/074787

§ 371 (c)(1),
(2) Date: Mar. 8, 2024

(87) PCT Pub. No.: WO2023/036795

PCT Pub. Date: Mar. 16, 2023

(65) Prior Publication Data

US 2024/0381048 A1 Nov. 14, 2024

Related U.S. Application Data

(60) Provisional application No. 63/242,223, filed on Sep. 9, 2021.

(51) Int. Cl.
*H04S 7/00* (2006.01)

(52) U.S. Cl.
CPC .......... *H04S 7/302* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 5,946,400 | A | 8/1999 | Matsuo | |
| 9,973,871 | B2 | 5/2018 | Koppens et al. | |
| 10,063,984 | B2 * | 8/2018 | Johnson | H04S 1/00 |
| 11,503,423 | B2 * | 11/2022 | Lee | H04S 7/306 |
| 2015/0350801 | A1 | 12/2015 | Koppens et al. | |
| 2020/0107149 | A1 * | 4/2020 | Sunder | H04S 7/304 |

(Continued)

FOREIGN PATENT DOCUMENTS

| | | | | |
|---|---|---|---|---|
| JP | H10-70796 A | | 3/1998 | |
| JP | 2016-507986 A | | 3/2016 | |
| WO | WO-2022108494 A1 | * | 5/2022 | H04S 7/00 |

OTHER PUBLICATIONS

International Search Report and Written Opinion dated Dec. 15, 2022 in PCT/EP2022/074787 (11 pages).

(Continued)

*Primary Examiner* — Brian T Pendleton
(74) *Attorney, Agent, or Firm* — Rothwell, Figg, Ernst & Manbeck, P.C.

(57) ABSTRACT

A method for modelling of a set of filters is provided. The method comprises acquiring a set of feature values each of which is associated with an index within an index range of the filters and dividing the index range into multiple segments using the acquired set of feature values. The method also comprises determining a filter model for at least one segment of the multiple segments and outputting the determined filter model.

16 Claims, 12 Drawing Sheets

(56) References Cited

U.S. PATENT DOCUMENTS

2020/0137508 A1 4/2020 Lee et al.
2023/0254661 A1 * 8/2023 Jansson Toftgård .... G06F 17/16
381/303

OTHER PUBLICATIONS

Babic, D. et al., "Polynomial-Based Filters with Polynomial Pieces of Different Lengths for Interpolation" 2003, Proceedings of the 3rd International Symposium on Image and Signal Processing and Analysis, XP010704583 (5 pages).
Vesma, J, et al., "Polynomial-Based Interpolation Filters—Part 1: Filter Synthesis", Circuits Systems Signal Processing, vol. 26, No. 2, 2007, pp. 115-146, DOI: 10.1007/s00034-005-0704-8, XP019540517 (32 pages).
Freeland, F.P. et al., "Interpolation of Head-Related Transfer Functions (HRTFS): a Multi-Source Approach", Jan. 19, 2022 (4 pages).

* cited by examiner

EFFICIENT MODELING OF FILTERS

CROSS REFERENCE TO RELATED APPLICATIONS

This application is a 35 U.S.C. § 371 National Stage of International Patent Application No. PCT/EP2022/074787, filed 2022 Sep. 7, which claims priority to U.S. Provisional Application No. 63/242,223, filed on 2021 Sep. 9, which are incorporated by this reference.

TECHNICAL FIELD

This disclosure relates to methods and apparatus for efficient modeling of filters.

BACKGROUND

We are equipped with two ears that capture sound waves propagating towards us. FIG. 1 illustrates a sound wave propagating towards a listener from a direction of arrival (DOA) specified by a pair of elevation and azimuth angles in the spherical coordinate system. On the propagation path towards us each sound wave interacts with our upper torso, head, outer ears, and the surrounding matter before reaching our left and right ear drums. This interaction results in temporal and spectral changes of the waveforms reaching the left and right eardrums, some of which are DOA dependent. Our auditory system has learned to interpret these changes to infer various spatial characteristics of the sound wave itself as well as the acoustic environment in which the listener finds himself/herself. This capability is called spatial hearing, which concerns how we evaluate spatial cues embedded in the binaural signal (i.e., the sound signals in the right and the left ear canals) to infer the location of an auditory event elicited by a sound event (a physical sound source) and acoustic characteristics caused by the physical environment (e.g., small room, tiled bathroom, auditorium, cave) we are in. This human capability, spatial hearing, can in turn be exploited to create a spatial audio scene by reintroducing the spatial cues in the binaural signal that would lead to a spatial perception of a sound.

The main spatial cues include 1) angular-related cues: binaural cues, i.e., the interaural level difference (ILD) and the interaural time difference (ITD), and monaural (or spectral) cues; 2) distance-related cues: intensity and direct-to-reverberant (D/R) energy ratio. FIG. 2 illustrates an example of ITD and spectral cues of a sound wave propagating towards a listener. The two plots illustrate the magnitude responses of a pair of HR filters obtained at an elevation of 0 degrees and an azimuth of 40 degrees (The data is from CIPIC database: subject-ID 28. The database is publicly available, which can be access from the URL www.ece.ucdavis.edu/cipic/spatial-sound/hrtf-data/). A mathematical representation of the short time DOA dependent temporal and spectral changes (1-5 msec) of the waveform are the so-called HR filters. The frequency domain (FD) representations of those filters are the so-called head-related transfer functions (HRTFs) and the time domain (TD) representations are the head-related impulse responses (HRIRs). An HR filter based binaural rendering approach has been gradually established, where a spatial audio scene is generated by directly filtering audio source signals with a pair of HR filters of desired locations. This approach is particularly attractive for many emerging applications, e.g., virtual reality (VR), augmented reality (AR), mixed reality (MR), or extended reality (XR), and mobile communication systems, where headsets are commonly used.

HR filters are often estimated from measurements as the impulse response of a linear dynamic system that transforms the original sound signal (input signal) into the left and right ear signals (output signals) that can be measured inside the ear channels of a listening subject at a predefined set of elevation and azimuth angles on a spherical surface of constant radius from a listening subject (e.g., an artificial head, a manikin/mannequin or human subjects). The estimated HR filters are often provided as finite impulse response (FIR) filters and can be used directly in that format. To achieve an efficient binaural rendering, a pair of HRTFs may be converted to Interaural Transfer Function (ITF) or modified ITF to prevent abrupt spectral peaks. Alternatively, HRTFs may be described by a parametric representation. Such parameterized HRTFs are easy to be integrated with parametric multichannel audio coders, e.g., MPEG surround and Spatial Audio Object Coding (SAOC).

Rendering a spatial audio signal to provide a convincing spatial perception of a sound at an arbitrary location in space requires a pair of HR filters at the corresponding location, and therefore, a set of HR filters at finely sampled locations on a two dimensional (2D) sphere is needed. Minimum audible angle (MAA) characterizes the sensitivity of our auditory system to an angular displacement of a sound event. Regarding localization in azimuth, MAA was reported to be the smallest in the front and back (about 1 degree), and much greater for lateral sound sources (about 10 degrees) for a broadband noise burst. MAA in the median plane increases with elevation. As small as 4 degrees of MAA on average in elevation was reported with broadband noise bursts. Currently, there are some publicly available HR filter databases densely sampled in space, e.g., SADIE database, CIPIC database. However, none of them completely fulfills the MAA requirement, particularly samples in elevation. Even though SADIE datasets of the artificial head Neumann KU100 and the KEMAR mannequin contain more than 8000 measurements, its sampling resolution in elevation between −15 degrees to 15 degrees is 15 degrees while 4 degrees is required according to the MAA studies. Inevitably, an angular interpolation of HR filters is needed so that a sound source can be rendered at locations of which no actual filters has been measured. FIG. 3 shows an example of sampling grid on a 2D sphere, where the dots indicate the locations where HR filters are measured.

A number of different interpolation schemes have been developed for angular interpolation of HR filters. In general, M pairs of HR filters, $\{h^{r/l}(\vartheta_m, \varphi_m)$: m=1, . . . , M$\}$, are estimated from measurements at $(\vartheta_m, \varphi_m)$ on a sphere, where r denotes the right ear, l denotes the left ear, $\vartheta$ denotes elevation, $\varphi$ denotes azimuth. The task is to find a function $F(\vartheta, \varphi)$ where $F^{r/l}(\vartheta_m, \varphi_m)=h^{r/l}(\vartheta_m, \varphi_m)$, which at non-sampled angles provides left and right filters that deliver audio rendering with good perceptual accuracy. Once $F(\vartheta, \varphi)$ is obtained, the left and the right ear HR filters can be generated at any arbitrary location specified by $(\vartheta, \varphi)$. Note that the superscript l or r is sometimes omitted for simplicity without confusion.

Here are two main approaches for HRTF angular interpolation:

(1) Local neighborhood approach: A commonly adopted approach is linear interpolation where a missing HRTF is inferred by weighting the contributions of measured HRTFs at its nearest surrounding positions. HRTFs may be preprocessed before interpolation, e.g., the measured HRTFs at two or more nearest locations are first converted to minimum phase and then a linear interpolation is applied.

(2) Variational approach: A more sophisticated data-driven approach is to linearly transform measured HRTFs into another space defined by a set of basis functions, where one set of basis functions covers the elevation and azimuth angle dimensions and another set covers the frequency dimension. The basis functions can be obtained by eigen-decomposition of the covariance matrix of measured HRTFs. Spherical harmonics (SHs), which is complete and orthogonal on a 2D sphere, have been widely used as basis functions to cover the elevation and azimuth angle dimensions. Basic-spline (B-spline) functions may be used in modelling HR filters.

SUMMARY

The ability to precisely and efficiently render the spatial position of a sound source is one of key features of an HR filter based spatial audio renderer. The spatial resolution of HR filter sets used in the renderer determines the spatial resolution of rendered sound sources. Using HR filter sets that are coarsely sampled over a 2D sphere, a VR/AR/MR/XR user usually reports spatial discontinuity of a moving sound. Such spatial discontinuities lead to audio-video sync errors that significantly decrease the sense of immersion. Using HR filter sets that are finely sampled over the sphere is one solution. However, estimating HR filter sets from input-output measurements on a fine grid that meets the MAA requirement can be very time consuming and tedious for both subjects and experimenters. Thus, it is more efficient to infer spatial-related information about missing HR filters given a sparsely sampled HR filter dataset.

The nearest-neighbor HR filter interpolation method assumes that HR filters at each sampled location influences an area only up to a certain finite distance. HR filters at unsampled locations are then approximated as a weighted average of HR filters at locations within a certain cut-off distance, or from a given number of the closest points on a rectilinear 2D grid. This method is simple, and the computational complexity is low, which can lead to an efficient implementation. However, the interpolation accuracy may not be enough to produce a convincing spatial audio scene. This is because the variation of conditions between sample points is more complex than a weighted average of filters can produce.

The variational approach represents the HR filters as a function of elevation and azimuth angles ($\vartheta$, $\varphi$). In a general form, the model can be represented by $h(\vartheta, \varphi; \alpha, \mathcal{A}) = f(\vartheta, \varphi; \alpha, \mathcal{A})$, where $f$ can be a linear or a non-linear function with a that includes all the model parameters and $\mathcal{A}$ that includes all the basis functions. The basis functions can be learnable or predefined. Regardless of whether a linear or nonlinear model is used, the optimal model parameter vector $\hat{\alpha}$ is obtained as the $\alpha$ vector that minimizes a loss function of choice L, which may include regularization terms $$\hat{\alpha} = \underset{\alpha}{\operatorname{argmin}}(L(h[m], h(\theta[m], \phi[m]; \alpha, \mathcal{A}), \alpha)),$$

where $h(\theta[m], \phi[m]; \alpha, \mathcal{A})$ is the approximation of the HR filter $h[m]$ at the sampled angle ($\theta[m]$, $\phi[m]$) given $\alpha$ and $\mathcal{A}$. Given a set of basis functions, the coefficients $\hat{\alpha}$ are considered to be the 'best' fit in the sense of solving the minimization problem. The model with the optimized model parameters is denoted by: $\hat{h}(\vartheta, \varphi; \hat{\alpha}, \mathcal{A})$.

In principle, there is no restriction on the choice of basis functions. Principal components (PCs) are often used as the basis functions, where the PCs were obtained by eigen-decomposition of the covariance matrix of HR filters in a dataset. The resulting model is efficient. It represents the original dataset well while there is no mechanism to interpolate HRTFs at missing locations. Recently, a hybrid method was proposed which combines principal component analysis (PCA) with nearest-neighbor method where the model coefficients are approximated by partial derivatives. However, the hybrid method achieves only similar results as the nearest-neighbor-based bilinear interpolation.

Another commonly used basis functions are spherical harmonics (SH). The SH model yields an encouraging level of performance in terms of the average mean squared error (MSE) of the model. Given that the SH basis functions are complex and costly to evaluate, it is basically impossible to be used in a real-time VR/AR/MR/XR system.

A B-spline HR filter model may be used to generate HR filters at any arbitrary locations in space. The model is accurate in terms of MSE measure, and the perceptual evaluation and the computational effort required to evaluate an HR filter from the model is much lower than that of models using spherical harmonics or other complex basis functions.

However, the B-spline HR filter model gives equal weight to each tap of the entire filter even though the contribution of each tap to binauralization varies significantly. Such equal weight results in redundancy in the model, and thus further improvement in modelling efficiency is needed.

Embodiments of this disclosure provide a method for efficient modeling of HR filters. Each HR filter in a HR filter set is represented as a data sequence having an index range and the embodiments of this disclosure can achieve the efficient modeling through automatic segmentation of the index range of the data sequences representing filters, where the filters are modeled using an individual filter model for each segment, which depends on variational characteristics of the segment. The resulting HR filter model is composed of the filter models over the different segments and can be used to generate HR filters at any arbitrary location in space, that is accurate and efficient enough to be used in a real-time VR/AR/MR/XR system. The resulting HR filter model may be accurate in terms of MSE measure and perceptual evaluation. Also the resulting HR filter model may be efficient in terms of the total number of basis functions and the computational effort required to evaluate an HR filter obtained from the HR filter model.

Even though embodiments described below focuses on modelling HR filter sets over spherical elevation and azimuth angles, the embodiments may be used for handling any set of data arrays sampled over a set of discrete spherical elevation and azimuth angles that can be modelled over a continuous space of spherical elevation and azimuth angles. Those data arrays (and/or sequences) can be represented either in the time domain or in other transformed domains (e.g., the frequency domain).

To generate HR filters at arbitrary locations accurately and efficiently, in one aspect, a method is provided for efficient modelling of a set of filters (e.g., Head-Related (HR) filters). The method comprises acquiring a set of feature values each of which is associated with an index within an index range of the data sequence representing the filters (e.g., 256-tap FIR HR filters have an index range of 1-256) and dividing the index range into multiple segments using the acquired set of feature values. The method further comprises determining a filter model for at least one segment of the multiple segments and outputting the determined filter model.

In another aspect, there is provided a computer program comprising instructions which when executed by processing circuitry cause the processing circuitry to perform the method described above.

In another aspect, there is provided an apparatus for efficient modelling of a set of filters (e.g., Head-Related (HR) filters). The apparatus is configured to acquire a set of feature values each of which is associated with an index within an index range of the data sequence representing the filters (e.g., 256-tap FIR filters have an index range of 1-256) and divide the index range into multiple segments using the acquired set of feature values. The apparatus is further configured to determine a filter model for at least one segment of the multiple segments and output the filter model.

From this point on, the index range of the data sequences representing the filters will be referred to as the index range of the filters.

In another aspect, there is provided an apparatus comprising a memory and processing circuitry coupled to the memory. The apparatus is configured to perform the method described above.

In some embodiments, the segments (within an indexing domain of data sequences) over which the filter set may be modelled with different variational characteristics (e.g., from small to large) may be automatically identified, and models having different model complexities may be used for different segments depending on different variational characteristics of the different segments. For example, segments with large variational characteristics may be represented by complex models while segments with small variational characteristics may be represented by simple models.

This discriminative mapping between a segment and the level of complexity of a model results in an efficient model representation of the data sequences, which requires significantly less space in memory than the original data sequences. Furthermore, building a filter model no longer requires densely sampled data sequences over the spherical elevation and azimuth angles. Lastly, the discriminative mapping between a segment and the level of complexity of a model allows providing an accurate and efficient interpolation solution for spherical angles between the discretely sampled spherical angles of the original data sequence. By allowing to provide an efficient and accurate model representation of the data sequences, the embodiments of this disclosure are especially useful for real-time VR/AR/MR/XR systems.

BRIEF DESCRIPTION OF THE DRAWINGS

The accompanying drawings, which are incorporated herein and form part of the specification, illustrate various embodiments.

DETAILED DESCRIPTION

Figure 1:
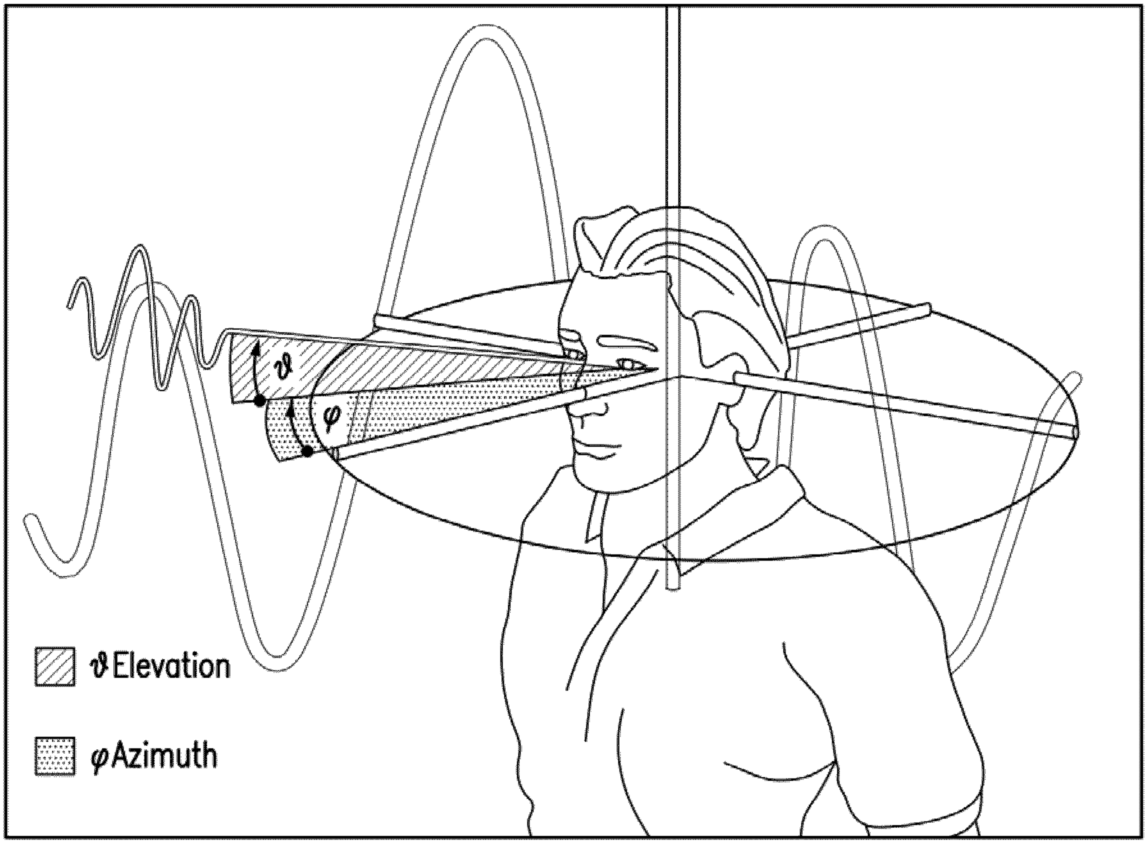
FIG. 1 illustrates a sound wave propagating towards a listener.
Figure 2:
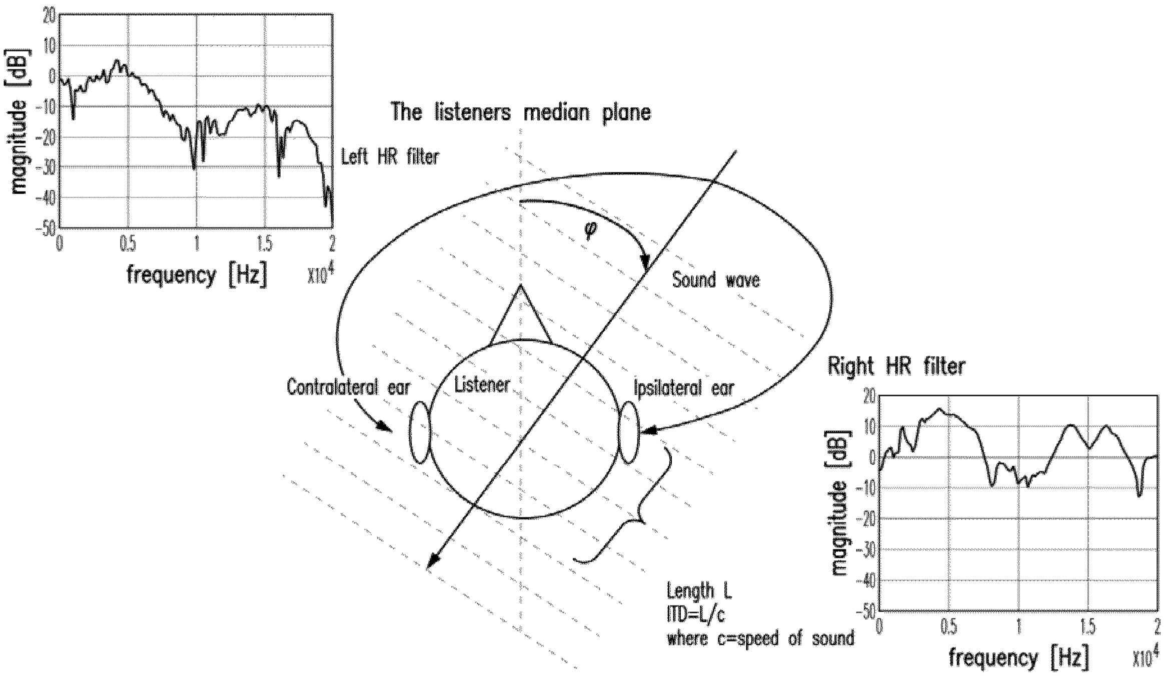
FIG. 2 shows Interaural Time Delay (ITD) and HR filters of a sound wave propagating towards a listener.
Figure 3:
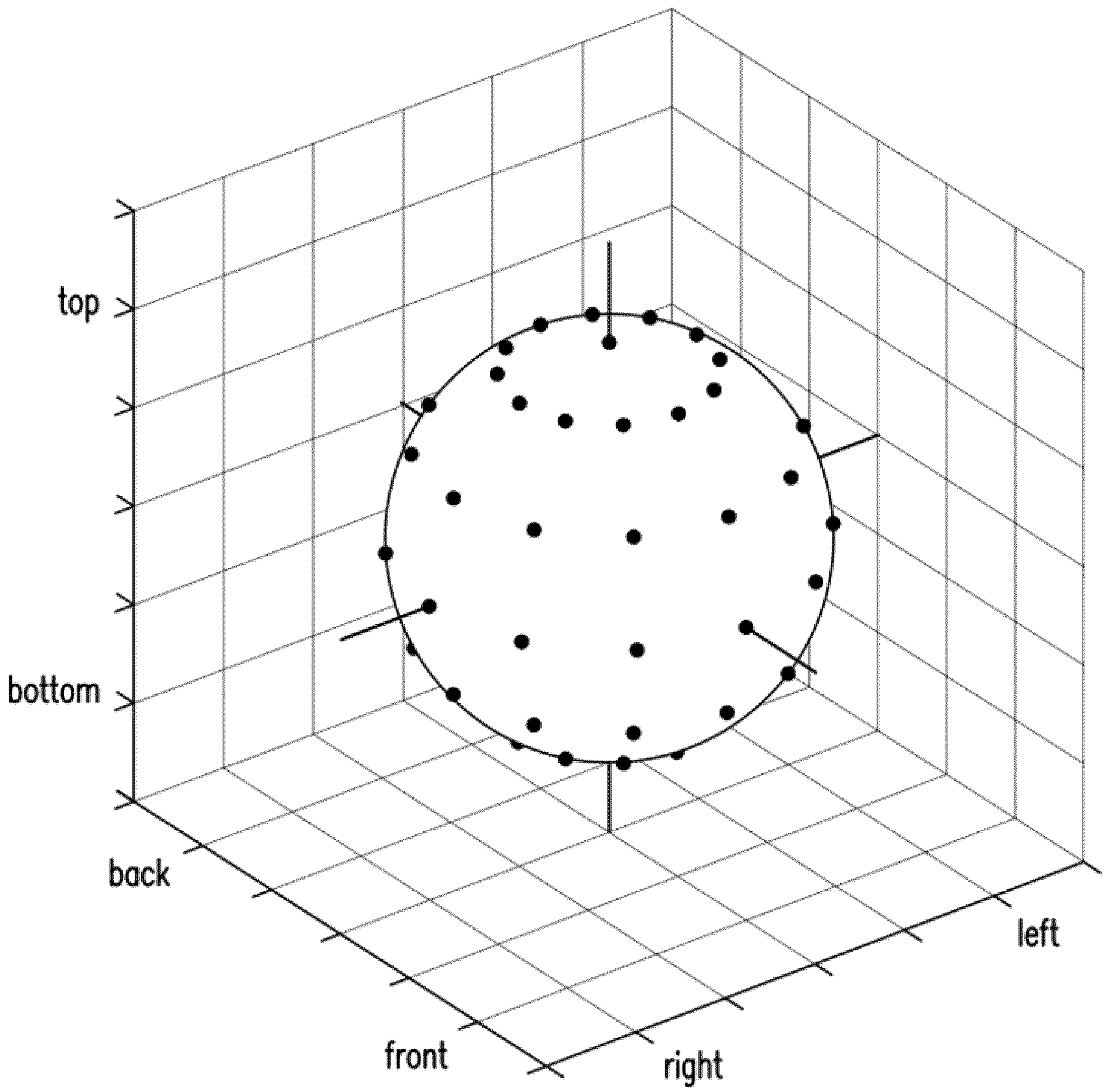
FIG. 3 shows an example of sampling grid on a 2D sphere.

In this disclosure, a filter (or a filter set, a filter dataset) and a HR filter (or a HR filter set, a HR filter dataset) are used interchangeably. However, a HR filter is one type of a filter. Thus, when a "filter" is mentioned in this disclosure, it may mean a HR filter or any other data filter.

1. Data Variables and Notation

General data structures may be denoted as lists of data sequences and other data structures. A basic HR filter dataset $\mathcal{H}$ that contains HR filters sampled at M elevation and azimuth angles $\{(\theta[m], \phi[m]): m=1, \ldots, M\}$, where $\theta$ and $\phi$ are respectively the elevation and azimuth angles, and m denotes am index, may be provided in the form of the data list $\mathcal{H}=\{\theta, \phi, H^l, H^l\}$.

- $\theta=\{\theta[m]: m=1, \ldots, M\}$ denotes a sequence of elevation angles.
- $\phi=\{\phi[m]: m=1, \ldots, M\}$ denotes a sequence of azimuth angles.
- $H^l=\{h^l[m]: m=1, \ldots, M\}$ denotes a set of left HR filters, where $h^l[m]=[h^l[1; m], \ldots h^l[n; m], \ldots, h^l[N^l; m]]$ is a Finite Impulse Response (FIR) filter of length $N^l$, and n is an index of the filter tap at a time instant.
- $H^r=\{h^r[m]:m=1, \ldots, M\}$ denotes a set of right HR filters, where $h^r[m]=[h^r[1; m] \ldots, h^r[n; m], \ldots, h^r[N^r; m]]$ is an $N^r$, filter of length $N^r$, and n is an index of the filter tap at a time instant.

The length of the left and the right filters may be the same, $N^l=N^r$.

In some embodiments, $\mathcal{H}$ may be an extended HR filter dataset. For example, in addition to $\theta$, $\phi$, $H^l$, $H^r$, $\mathcal{H}$ may additionally contain data sequences of onset delays that indicate the onset of the impulse responses. In such case, $\mathcal{H}=\{\theta, \phi, H^l, H^r, \tau^l, \tau^r\}$, where

- $\tau^l=\{\tau^l[m]: m=1, \ldots, M\}$ denotes a sequence of onset delays of left HR filters.
- $\tau^l=\{\tau^l[m]: m=1, \ldots, M\}$ denotes a sequence of onset delays of right HR filters.

Additionally, $\mathcal{H}$ may also contain a data sequence of Interaural Time Delays (ITDs) derived from onset delays of the left and the right HR filters, i.e., $\mathcal{H}=\{\theta, \phi, H^l, H^r, \tau^l, \tau^r, \tau^{ITD}\}$, where $\tau^{ITD}=\{\tau^{ITD}[m]: m=1, \ldots, M\}$ denotes a sequence of ITDs.

Alternatively, instead of data sequences of onset delay, $\mathcal{H}$ may contain a data sequence of ITDs derived from the onset delays of the left and the right HR filters, i.e., $\mathcal{H}=\{\theta, \phi, H^l, H^r, \tau^{ITD}\}$.

In the embodiments described below, three different HR filter datasets are used—an original dataset $\mathcal{H}_0$, a set of segmented datasets $\mathcal{H}_S$, and a model-generated dataset $\mathcal{H}_M$.

The original dataset $\mathcal{H}_0$ always contains $\{\theta_0, \phi_0, H^l_0, H^r_0\}$, but may additionally contain $\{\tau^l_0, \tau^r_0\}$. Particularly, if $H^l_0$ and $H^r_0$ are zero-time-delay HR filter sets, either $\{\tau^l_0, \tau^r_0\}$ or $\{\tau^{ITD}_0\}$ is needed to restore the ITD information.

Thus, as discussed above, $\mathcal{H}_0$ may be represented as $\mathcal{H}_0=\{\theta_0, \phi_0, H^l_0, H^r_0\}$ or $\{\theta_0, \phi_0, H^l_0, H^r_0, \tau^l_0, \tau^r_0\}$ or $\{\theta_0, \phi_0, H^l_0, H^r_0, \tau^{ITD}_0\}$.

The set of segmented datasets $\mathcal{H}_S=\{\mathcal{H}_i: i=1, \ldots, 1\}$ contains/sets of segmented HR filter taps, which may be used in a modelling module. The i-th set $\mathcal{H}_i$ is in the form of the data list $\mathcal{H}_i=\{\theta_0, \phi_0, H_i^l, H^r_i\}$. $H^l_i$ and $H^r_i$ are the left and right sequences of filter taps extracted from $H^l_0$ and $H^r_0$ given the segmentation parameters $\boldsymbol{n}_i^l, \boldsymbol{n}_i^r$.

- $\boldsymbol{n}=[n^l_i[1], \ldots, n^l_i[\mathcal{N}^l]]$ is a sequence of indices of left HR filter taps for the i-th segment and $\Sigma^l_{i=1}\mathcal{N}^l \leq N^l$.
- $\boldsymbol{n}=[\mathcal{N}^r_i[1], \ldots, \mathcal{N}^r_i[\mathcal{N}_i^r]]$ is a sequence of indices of right HR filter taps for the i-th segment and $\Sigma^l_{i=1}\mathcal{N}^r_i \leq N^r$.
- $H^l_i=\{h^l_i[m]: m=1, \ldots, M\}$, where $[h^l_0[\mathcal{N}^l_i[1]; m], \ldots, h^l_0[\mathcal{N}^l_i[\mathcal{N}^l_i]; m]]$ is a sequence of HR filter taps of length $\mathcal{N}_i^r$.
- $H_i^l=\{h_i^l[m]: m=1, \ldots, M\}$, where $h_i^r[m]=[h_0^r[\mathcal{N}_i^r[1]; m], \ldots, h_0^r[\mathcal{N}_i^r[\mathcal{N}_i^r]; m]]$ is a sequence of HR filter taps of length $\mathcal{N}_i^r$.

The model-generated dataset $\mathcal{H}_M$ is a filter set generated from a HR filter model $\mathcal{M}$. It always contains $\{\theta, \phi, H_M^l, H_M^r\}$. Depending on the type of filters in $\mathcal{H}_0$, $\mathcal{H}_M$ may also contain $\{\tau_0^l, \tau_0^l\}$ or $\{\tau_M^{ITD}\}$.

A statistical feature set may be used to obtain the segmentation parameters $\boldsymbol{n}_i^l$, $\boldsymbol{n}_i^r$. The feature set is represented as $\mathcal{S}=\{S^l, S^r\}$.

- $S^l=\{s^l[n]: n=1, \ldots, N^l\}$, where $[s^l][n]=[s^l][1, n], \ldots, s^l[J, n]$ is a sequence of J features obtained from the n-th left HR filter taps $[h^l[n; 1], \ldots h^l[m; m], \ldots, h^l[n; M]]$. J is also called the dimension of the feature set.
- $S^r=\{s^r[n]: n=1, \ldots, N^r\}$, where $s^r[n]=[s^r[1, n], \ldots, s^r[J, n]]$ is a sequence of J features obtained from n-th right HR filter taps $[h^r[n; 1], \ldots h^r[n; m], \ldots, h^r[n; M]]$.

In order to simplify notation, for the rest of this disclosure, the sub- and/or superscripts will be omitted when they are not specifically needed.

2. Brief Overview of the Method for Modelling HR Filters

Figure 4:
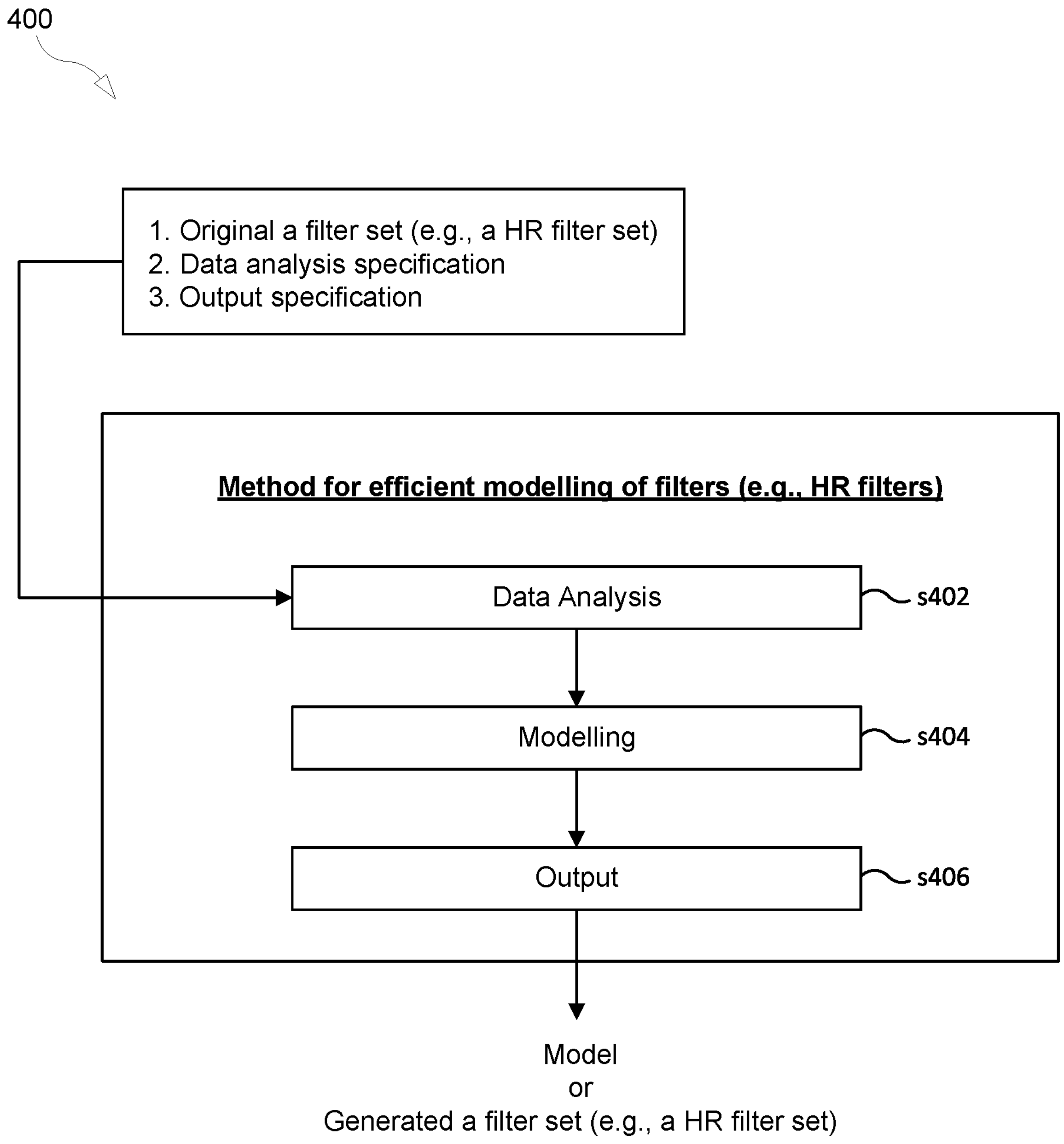
FIG. 4 shows a simplified process according to some embodiments.

FIG. 4 shows a method 400 for improving efficiency of modelling HR filters. The method 400 may comprise data analysis step s402, modelling step s404, and output step s406.

Inputs of the method 400 may be an HR filter dataset $\mathcal{H}_0$, data analysis specification X, and output specification O.

The original HR filter dataset $\mathcal{H}_0$ may be obtained by loading the HR filter dataset from an existing file into $\mathcal{H}_0$.

The data analysis specification $X=\{\mathbb{S}, \mathbb{C}, \mathcal{Q}\}$ may be (1) a list of desired statistical features $\mathbb{S}$, and (2) a feature analysis algorithm $\mathbb{C}$, and/or (3) a set of parameters $\mathcal{Q}$ associated with the algorithm $\mathbb{C}$, if required.

The statistical features may summarize main variational characteristics of each HR filter tap across angles. As mentioned above, the contribution of each HR filter tap to the binauralization varies significantly. Given that the HR filters are DOA dependent, such contribution can be quantitatively measured by the variability of the HR filter tap across angles, and the contribution increases proportionally to the level of the variability. Therefore, measures of statistical variability may be useful and desirable.

A sophisticated data clustering algorithm may be specified and used to analyze a distribution of the statistical features which are then used to categorize the HR filter taps for segmentation. The required parameter setting may include a distance function d to use, a set of criteria $\mathfrak{C}$ to express similarity and/or separation of the clusters in the clustering to be found, the number of expected clusters/that corresponds to the number of segments, and so on.

On the other hand, a simple technique may be enough for segmentation if the desired feature set is one-dimensional.

The output specification O may include the type, denoted by $\mathbb{T}$, of the desired output dataset and, if needed, the sequence of the desired angles $\{\theta_D, \phi_D\}$. $\mathbb{T}$ indicates if the output dataset is a model representation $\mathcal{M}$ of the HR filter dataset $\mathcal{H}_0$, or a model-generated HR filter dataset $\mathcal{H}_M$. $\{\theta_D, \phi_D\}$ may be obtained directly from $\mathcal{H}_0$. The output may be an improved HR filter dataset. The HR filters of the improved HR filter dataset may be stored in the same format as $\mathcal{H}_0$ or may be represented by a model or a model-generated HR filter set.

According to some embodiments, the HR filter modelling method 400 may contain three steps.

Data Analysis Step (s402)—The data analysis step may be used to quantitatively describe statistical features of an HR filter set and identify boundaries that divide HR filter taps into several non-overlapping segments.

Modeling Step (s404)—The modelling step may transform an HR filter dataset into an efficient representation in the form of a mathematical model. The non-overlapping segments may be modelled separately, and the model complexity may depend on the variational characteristics of the filter taps in the segment.

Output Step (s406)—The output step may output a dataset according to the output specification O.

According to some embodiments, the HR filter modelling method 400 may be performed in a single entity or in multiple connected entities. For example, the method 400 may be performed in a binaural audio renderer. In another example, the method 400 may be performed in a single server (e.g., edge server).

This method can be run off-line or inside a binaural audio renderer in connection with loading an HR filter set into the renderer.

3. Description of the Method for Modelling HR Filters

Figure 5:
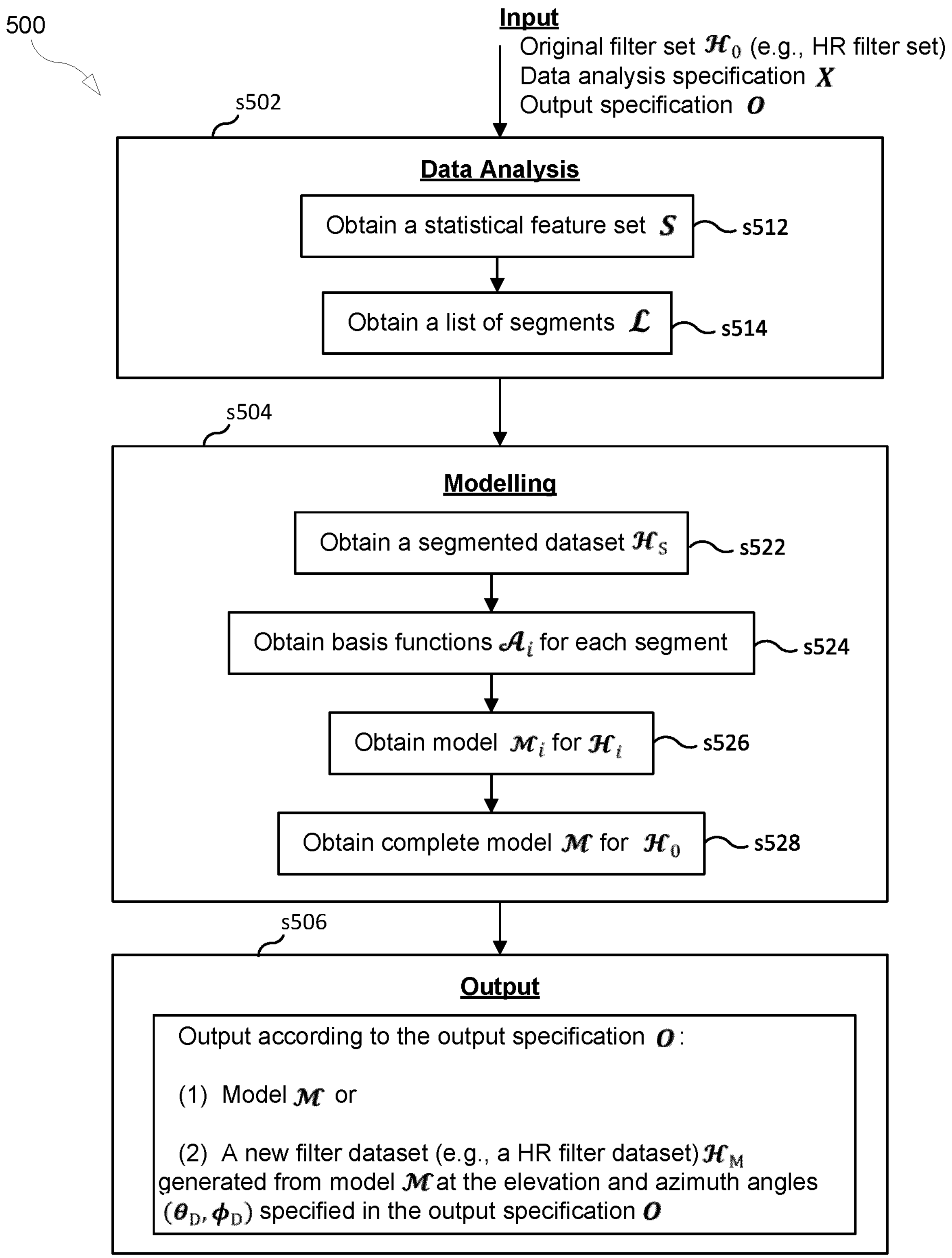
FIG. 5 shows a process according to some embodiments.

FIG. 5 shows a method 500 for efficiently modelling HR filters of an HR filter set. Inputs of the method 500 may include: an HR filter dataset $\mathcal{H}_0$, data analysis specification X, and output specification O.

As explained above, $\mathcal{H}_0=\{\theta_0, \phi_0, H_0^l, H_0^r\}$ or $\{\theta_0, \phi_0, H_0^l, H_0^r, \tau_0^l, \tau_0^r\}$ or As further explained above, the data analysis specification X is a set of any one or a combination of $\{\mathbb{S}, \mathbb{C}, \mathcal{Q}\}$, where $\mathbb{S}$ is a list of desired statistical features, $\mathbb{C}$ is a feature analysis algorithm, and $\mathcal{Q}$ is a set of parameters associated with the algorithm $\mathbb{C}$.

The output specification O may define the type, denoted by $\mathbb{T}$, of the desired output dataset and, if needed, the sequence of the desired angles $\{\theta_D, \phi_D\}$.

After obtaining the inputs, the method 500 may execute three steps: (1) data analysis step s502, (2) modelling step s504, and (3) output step s506. Each of the three steps s502-s506 is described below in detail.

3.1 Step s502: Data Analysis Step

The data analysis step s502 may be used to quantitatively describe statistical features of the HR filters in $\mathcal{H}_0$ and identify boundaries that divide HR filters into several non-overlapping segments.

As shown in FIG. 5, the data analysis step s502 may include the following two sub-steps s512 and s514: (1) sub-step s512: obtaining a statistical feature set $\mathcal{S}$ and (2) sub-step s514: obtaining a list of segments $\mathcal{L}$.

3.1.1 Sub-Step s512: Obtaining a Statistical Feature Set $\mathcal{S}$

The data analysis specification X may specify the statistical features $\mathbb{S}$ that are to be calculated from the HR filters in $\mathcal{H}_0$. The statistical features may be obtained for each HR filter tap, and their values are stored in $\mathcal{S}=\{s^l, s^r\}$. $S^l=\{s^l[n]: n=1, \ldots, N^l\}$, where $s^l[n]=[s^l[1, n], \ldots, s^l[J, n]]$ is a sequence of J features obtained from the n-th left HR filter taps $[h^l[n; 1], \ldots h^l[n; m], \ldots, h^l[n; M]]$. $S^r=\{s^r[n]: n=1, \ldots, N^r\}$, where $s^r[n]=[s^r[1, n], \ldots, s^r[J, n]]$ is a sequence of J features obtained from n-th right HR filter taps $[h^r[n; 1], \ldots h^r[n; m], \ldots, h^r[n; M]]$.

In one embodiment, index of dispersion (IOD) may be used as the statistical feature to measure the statistical variability of each HR filter tap across angles. In general, IOD is defined as the ratio of variance to mean, where the mean is non-zero, and it is only used for positive statistics. Since the mean of HR filters may be negative, in order to make sure that IOD is always positive, the IOD may be modified (herein after, modified IOD—a.k.a., MIOD) as a ratio of variance to normalized L1 norm (instead of mean). This modification is reasonable because for HR filters, what is of great interest is whether a time instant (tap index) is in the active segment of the impulse responses or not, irrespective of if the tap values are positive or negative.

The MIOD at a time instant may be calculated as:

$$MIOD(n) = \frac{\sum_{m=1}^{M}\left|h_0[n; m] - \frac{1}{M}\sum_{m=1}^{M} h_0[n; m]\right|^2}{\sum_{m=1}^{M}|h_0[n; m]|}$$

where M is the total number of sample angles at which HR filters are measured and obtained and n is an integer between 1 and $N^l$ or $N^r$ (which is a total number of left or right HR filter taps).

Then the feature set of the left HR filter taps may be:

$$S^l = \{s^l[n]: n = 1, \ldots, N^l\} = [MIOD^l(n): n = 1, \ldots, N^l]$$

Similarly, the feature set of the right HR filter taps may be:

$$S^r = \{s^r[n]: n = 1, \ldots, N^r\} = [MIOD^r(n): n = 1, \ldots, N^r].$$

An ideal MIOD curve may be a 'bell'-shaped-like curve. The curve has a single maximum at index $n_{max}$, and its value asymptotically decreases with $|n-n_{max}|$.

Figure 6A:
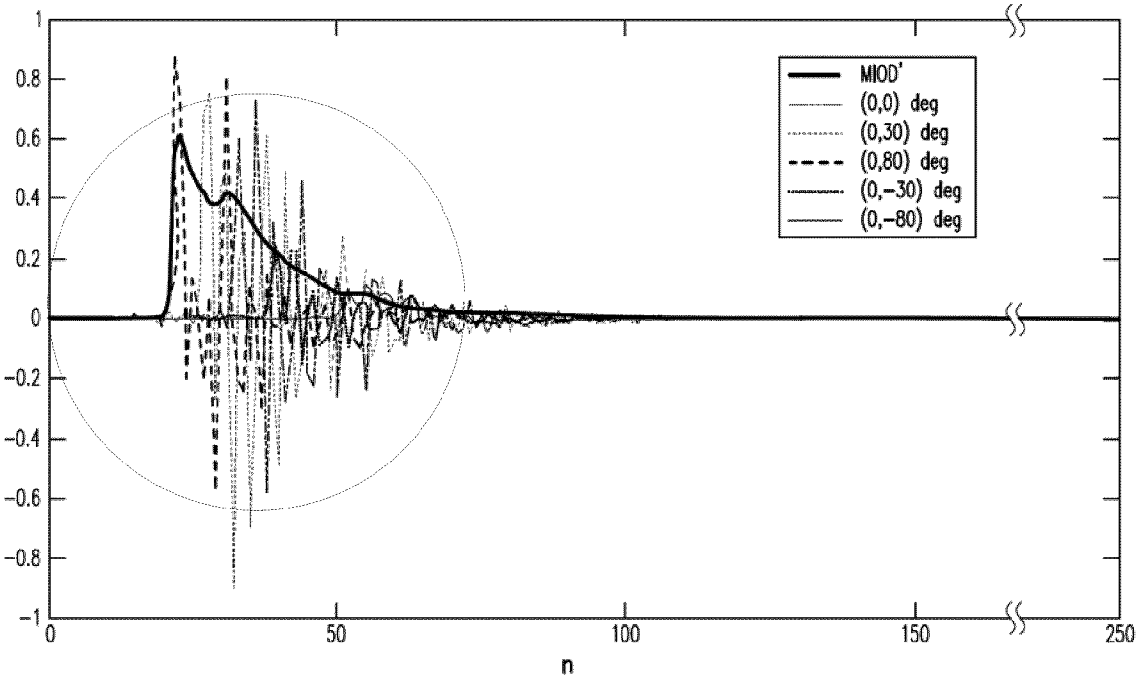
FIGS. 6A and 6B show an example of a Modified Index of Dispersion (MIOD) curve.
Figure 6B:
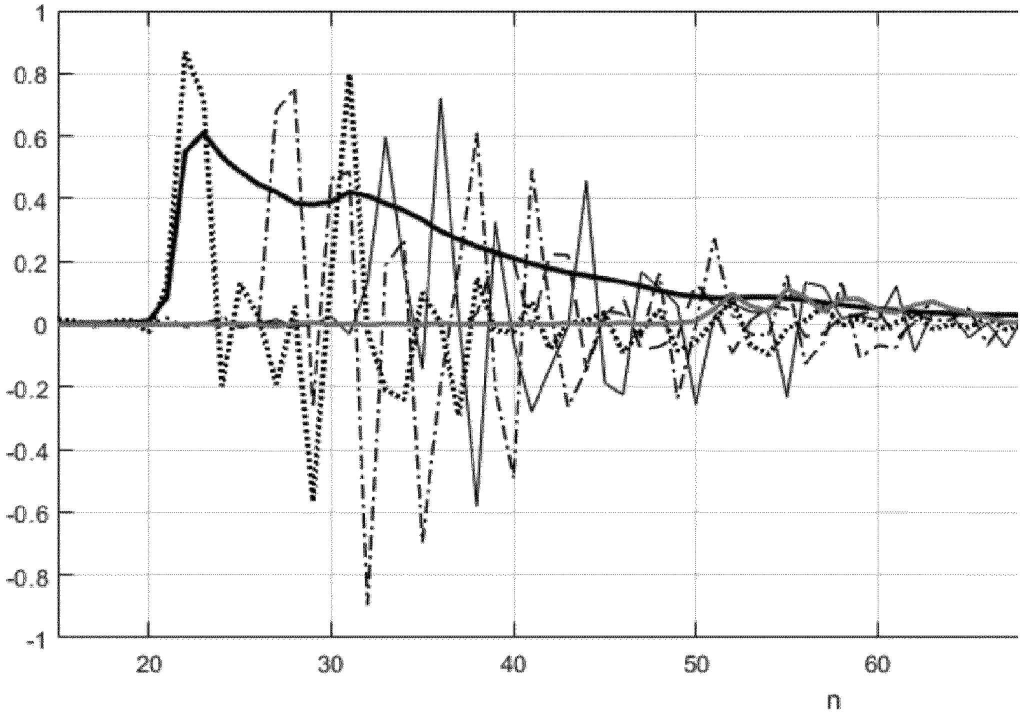

FIG. 6A shows an example of an MIOD curve—$MIOD^l$—that is calculated from the left ear HR filters from the FABIAN database (https://depositonce.tu-berlin.de/handle/11303/6153.4). The HR filters at five azimuth angles, 0 deg (middle), −30 deg (right), −80 deg (right), 30 deg (left), 80 deg (left), on the horizontal plane are plotted as well. It is clearly seen that the "cup" area, where the MIOD has a large value, corresponds to the region of n where the main impulse responses of the HR filters in the dataset appear. FIG. 6B shows an enlarged portion of the MIOD curve shown in FIG. 6A.

As discussed above, $H^l=\{h^l[m]: m=1, \ldots, M\}$, where $h^l[m]=[h^l[1; m] \ldots, h^l[n; m], \ldots, h^l[N^r; m]]$ may be an FIR filter of length $N^l$. In the example shown in FIG. 6A, $N^l$ is equal to 256.

As a result of performing the sub-step s512, a variation score (e.g., $MIOD^l(n)$) for each index ($n=1, 2, 3, \ldots N^l$) may be obtained. For example, index 1 may be associated with variation score #1 and index 2 may be associated with variation score #2 where each of the variation scores #1 and #2 is a positive number.

3.1.2 Sub-Step s514: Obtaining a List of Segments $\mathcal{L}$

As explained above, the data analysis specification X may be a set of any one or a combination of $\{\mathbb{S}, \mathbb{C}, \mathcal{Q}\}$, where $\mathbb{S}$ is a list of desired statistical features, $\mathbb{C}$ is a feature analysis algorithm, and $\mathcal{Q}$ is a set of parameters associated with the algorithm.

Given the feature analysis algorithm $\mathcal{C}$ and possibly the set of parameters $\mathcal{Q}=\{d, \mathfrak{C}, I\}$ associated with the algorithm, data analysis may be performed on the feature set $S^l$ and $S^r$, respectively. As a result of the data analysis, each feature set may be divided into I groups, i.e., $$S^l = \{s^l[\boldsymbol{n}_i^l]: i = 1, \ldots, I\}, \text{ where } \boldsymbol{n}_i^l = [\boldsymbol{n}_i^l[1], \ldots, \boldsymbol{n}_i^l[\mathcal{N}_i^l]],$$
$$\boldsymbol{n}_i^l \subset [1, \ldots, N^l] \text{ and } \sum_{i=1}^{I} \mathcal{N}_i^l \le N^l;$$
$$S^r = \{s^r[\boldsymbol{n}_i^r]: i = 1, \ldots, I\}, \text{ where } \boldsymbol{n}_i^r = [\boldsymbol{n}_i^r[1], \ldots, \boldsymbol{n}_i^r[\mathcal{N}_i^r]],$$
$$\boldsymbol{n}_i^r \subset [1, \ldots, N^r] \text{ and } \sum_{i=1}^{I} \mathcal{N}_i^r \le N^r.$$

Figure 7:
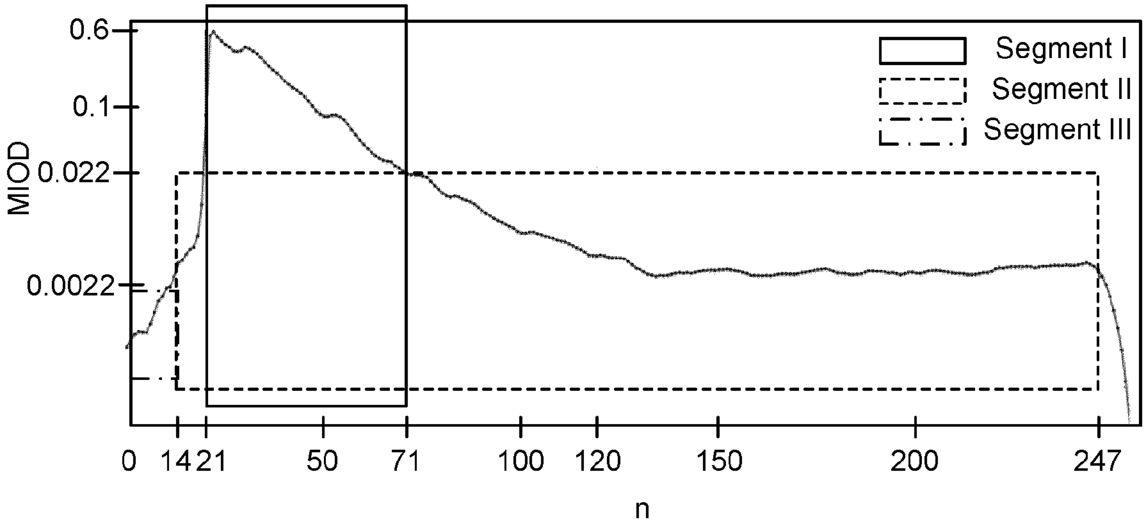
FIG. 7 illustrates an example of MIOD-based segmentation.

For example, as shown in FIG. 7, the feature set of the left HR filter taps may be divided into three groups-segments I-III. Here, the number of segments I is equal to 3.

The three groups may be non-overlapping, which means that $\boldsymbol{n}_i^l \cap \boldsymbol{n}_{i'}^l = \emptyset$ and $\boldsymbol{n}_i^r \cap \boldsymbol{n}_{i'}^r = \emptyset$ for i≠i'. The analysis results may then be used to obtain a list of non-overlapping segments $\mathcal{L}$ of the HR filter taps. Each item in the list may contain: (1) a segmentation ID i; (2) a set of indices $\{\boldsymbol{n}_i^l\}$, $\{\boldsymbol{n}_i^r\}$; and (3) a variability level $\mathbb{L}_i$. This is explained in more detail in the following paragraphs.

Taking FIG. 7 as an example, as a result of performing sub-step s514, a list of segments $\mathcal{L}$ may be obtained. The list $\mathcal{L}$ may include segmentation IDs identifying the segments I-III, a set of indices defining the boundary of each of the segments I-III, and a variability level of each of the segments I-III.

In one embodiment, a sophisticated data clustering algorithm may be used to analyze a distribution of a feature set. This may be particularly important and useful when the feature set is multi-dimensional. The required parameter setting may include a distance function d to use, a set of criteria $\mathfrak{C}$ to express similarity and/or separation of the clusters in the clustering to be found, the number of expected clusters/that corresponds to the number of segments, and so on.

In another embodiment, a simple technique may be enough for segmentation, e.g., thresholding, when the desired feature set is one-dimensional. For example, in a scenario where MIOD is the desired feature as the variability measure, the simplest thresholding method may be used—which is to set fixed constants $\mathfrak{C}=\{\eta_i: i=1, \ldots, I\}$, and is found by $$\boldsymbol{n}_i = \arg\underset{n}{find}(MIOD[n] > \eta_i).$$

In one embodiment, the variability levels of the segments, where the number of segments is I, are assigned the level values $LV_1$, $LV_2$, . . . , $LV_1$, where level $LV_1$ is assigned to the segment where all taps have MIOD values above the highest threshold; level $LV_2$ is assigned to the segment where all taps have MIOD values above the second highest threshold (and less than the highest threshold), etc.

FIG. 7 shows an example of MIOD-based segmentation. For example, all of the MIOD values of the segment having the level value $LV_1$ is greater than or equal to a first threshold (i.e., the first threshold≤the MIOD values) and all of the MIOD values of the segment having the level value $LV_2$ is greater than or equal to a second threshold but less than the first threshold (i.e., the second threshold≤the MIOD values≤the first threshold).

The thresholds may be user-defined or may be set automatically. In the embodiments of setting the thresholds automatically, thresholds may be determined dynamically using a cumulative histogram shape-based method.

Figure 8:
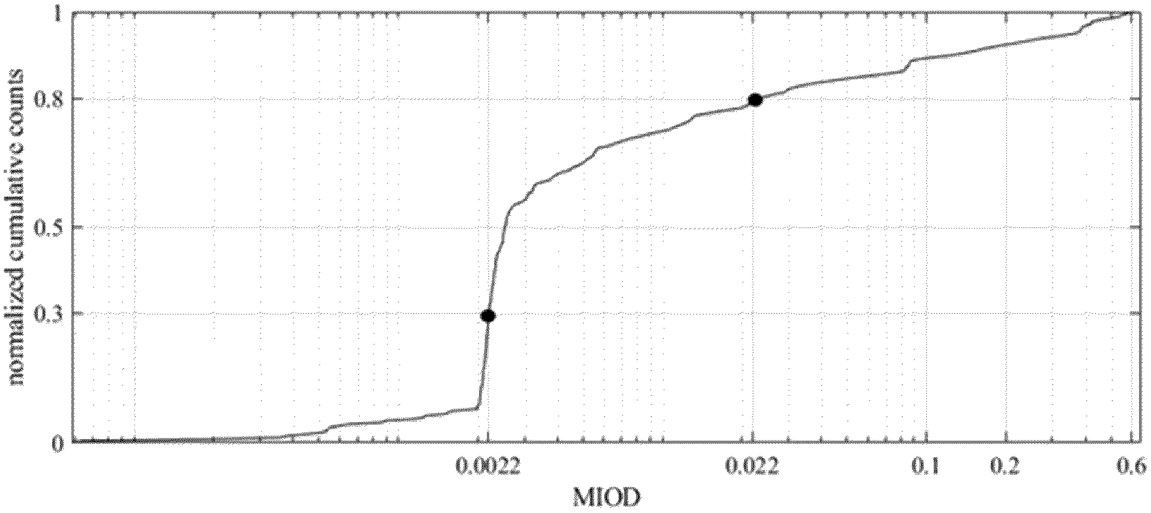
FIG. 8 shows a cumulative histogram of MIOD values.

FIG. 8 shows a cumulative histogram of the MIOD values from FIG. 7. The number of segments I (e.g., three) may be chosen by the user. In one embodiment the segment with the highest level of variation is chosen to contain 20% of the filter taps. In the cumulative histogram shown in FIG. 8 it is seen that the segment with the highest level of variation is obtained for MIOD levels greater than 0.022. So the MIOD threshold for the segment with the highest level of variation is set to be 0.022.

The threshold for the segment with the lowest level of variation is chosen to be one tenth of that threshold, 0.0022 and the segment chosen to contain all MIOD values less than that threshold. When I=3, there is only one segment left, namely the one with MIOD values between 0.0022 and 0.022. For I greater than 3 that threshold interval would be divided into more subintervals. The value of I (i.e., the number of segments), the values of the thresholds, and the percentage(s) of filter taps the segment(s) contains are provided in this paragraph for illustration purpose only and do not limit the embodiments of this disclosure in any way. There are many possible methods for implementing that subdivision that are not specified further here.

In some databases, the length of the HR filters ($N^l$ and $N^r$) may be much longer than necessary, implying that the contribution of some filter taps to the binauralization is too little and those filter taps are considered to be redundant. For such scenarios, a threshold may be specified in $\mathfrak{C}$ below which the variability level of a segment is too low to contribute to binaulization, and the segment can be discarded. This results in $\Sigma_{i=1}^{I}\mathcal{N}_{i\,i}^{\,l}<\mathcal{N}_i^{\,l}$ and $\Sigma_{i=1}^{I}\mathcal{N}_{i\,i}^{\,r}<N^r$.

3.2 Step s504: Modelling Step

The modelling step s504 shown in FIG. 5 may be performed for each of all segments. The modelling step s504 may comprise the following four sub-steps: (1) sub-step s522—obtaining a segmented dataset $\mathcal{H}_S$, (2) sub-step s524—obtaining basis functions $\boldsymbol{\mathcal{A}}_i$ for segment i, (3) sub-step s526—obtaining model $\boldsymbol{\mathcal{M}}_i$ for $\boldsymbol{\mathcal{H}}_i$, and (4) sub-step s528—obtaining complete model $\boldsymbol{\mathcal{M}}$, may additionally include obtaining delay model $\boldsymbol{\mathcal{M}}_r$.

3.2.1 Sub-Step s522: Obtaining the Segmented Dataset $\mathcal{H}_S$

The set of segmented datasets $\boldsymbol{\mathcal{M}}_S=\{\boldsymbol{\mathcal{M}}_i$: i=1, . . . , I}, where $\boldsymbol{\mathcal{M}}_H=\{\theta_0, \phi_0, H_i^l, H_i^r\}$ are obtained as the corresponding data structures in $\boldsymbol{\mathcal{M}}_0$. $H_i^l$, $H_i^r$ are extracted from $H_0^l$, $H_0^r$ in $\boldsymbol{\mathcal{M}}_0$ according to the set of indices $\{\boldsymbol{n}_i^l, \boldsymbol{n}_i^r\}$ in the list of segments $\boldsymbol{\mathcal{L}}$, where $H_i^l=\{h_i^l[m]$: m=1, . . . , M}, where $h_i^l[m]=[h_0^l[\mathcal{n}_i^l[1]; m], \ldots, h_0^l[\mathcal{n}_i^l[\mathcal{N}_{i\,i}^{\,l}n]; m]]$ is a sequence of HR filter taps of length $\mathcal{N}_{i\,i}^{\,l}$ $H_i^r=\{h_i^r[m]$: m=1, . . . , M}, where $h_i^r[m]=[h_0^r[\mathcal{n}_i^r[1]; m], \ldots, h_0^r[\mathcal{n}_i^r[\mathcal{N}_{i\,i}^{\,r}]; m]]$ is a sequence of HR filter taps of length $\mathcal{N}_{i\,i}^{\,r}$.

Taking FIG. 7 as an example, the set of segmented datasets $\boldsymbol{\mathcal{M}}_S=\{\boldsymbol{\mathcal{M}}_i$: i=1, 2, 3} may be obtained. $\boldsymbol{\mathcal{M}}_1$ corresponds to indices between 21 and 71, $\boldsymbol{\mathcal{M}}_2$ corresponds to indices between 14-20 and between 72-247, and $\boldsymbol{\mathcal{M}}_3$ corresponds to indices between 1 and 13 and between 248 and 256.

3.2.2 Sub-Step s524—Obtaining Basis Functions $\boldsymbol{\mathcal{A}}_i$ for Segment i.

The basic principle is that the number of basis functions and the complexity of the basis functions is in inverse proportion of the variation level of the segment. The specific implementation of this principle may vary with the type of basis functions chosen and computational considerations.

3.2.3 Sub-Step s526: Obtaining Model $\mathcal{M}_i$ for $\mathcal{H}_i$

The i-th set of the segmented left and right filter taps, $H_i^l$ and $H_i^r$, may be modelled separately.

The spatial variation of the filter taps in $H_i$ may be modelled individually as a function of elevation and azimuth angles (ϑ, φ). In a general form, the model may be represented by $h_i(\vartheta, \varphi; \boldsymbol{\mathcal{A}}_i, \boldsymbol{\mathcal{A}}_i)=f_i(\vartheta, \varphi; A_i, \boldsymbol{\mathcal{A}}_i)$, where $f$ can be a linear or a non-linear function with $A_i$ that includes all the model parameters and $\boldsymbol{\mathcal{A}}_i$ that includes all the basis functions. The basis functions can be learnable or predefined. The complexity of the model $f_i(\vartheta, \varphi; A_i, \boldsymbol{\mathcal{A}}_i)$ is determined by the variability level $\mathbb{L}_i$. The higher the variability level is, the more complex the model is.

As an example, for a linear model, this function may be explicitly represented by $$h_i(\vartheta, \varphi; A_i, \boldsymbol{\mathcal{A}}_i) = \sum_{p=1}^{P_i} \alpha_{1,p}\mathcal{A}_{1,p}(\vartheta, \varphi),$$

where $A_i=\{\alpha_{i,p}$: p=1, . . . , $P_i\}$ with $\alpha_{i,p}$ being the model parameter vector of length $\mathcal{N}_1$ and $\boldsymbol{\mathcal{A}}_i=\{\mathcal{A}_{i,p}(\vartheta, \varphi)$: p=1, . . . , $P_i\}$ is the sequence of basis function vectors. If the variability level $\mathbb{L}_i$ is high, a better modeling result may be achieved by increasing the number of basis functions and/or using more complex basis functions.

Note that ϑ and φ are used here instead of θ and ϕ to distinguish spatial variables from fixed spatial sampling points. Regardless of whether a linear or a nonlinear model is used, the optimal model parameter vectors $\hat{A}_i$ may be obtained as the $A_i$ vectors that minimizes a loss function of choice L that can include regularization terms $$\hat{A}_i = \underset{A_i}{\operatorname{argmin}}\left(L\left(h_i[m], h_i(\theta[m], \phi[m]; A_i, \boldsymbol{\mathcal{A}}_i), A_i\right)\right),$$

where $h_i(\theta[m], \phi[m]; A_i, \boldsymbol{\mathcal{A}}_i)$ is the approximation of $h_i[m]$ at the sampled angle (θ[m], ϕ[m]) given $\hat{A}_i$ and $\boldsymbol{\mathcal{A}}_i$. One example of such a loss function is a squared error loss $$\hat{A}_i = \underset{A_i}{\operatorname{argmin}}\left(\sum_m \left\| h_i[m] - h_i(\theta[m], \phi[m]; A_i, \boldsymbol{\mathcal{A}}_i)\right\|^2\right).$$

For a linear model, the optimal model parameter matrix $\hat{A}_i$ may be obtained through a linear least-squares estimation. For a nonlinear model, the optimal model parameter matrix $\hat{A}_i$ may be estimated through iterative gradient based methods.

The model representation of the i-th segment $\mathcal{H}_i$ is denoted by $\mathcal{M}_{\mathcal{H}_i}=\{f_i, \mathcal{A}_i, \hat{A}_i^l, \hat{A}_i^r\}$ containing the optimal model parameter vectors $\hat{A}_i^l$ and $\hat{A}_i^r$, the basis functions $\mathcal{A}$, and the modelling function itself $f_i$ that determines the relationship between the model parameter and the basis function. Given $\mathcal{M}_{\mathcal{H}_i}$, the HR filter taps in the i-th segment at angle $(\vartheta, \varphi)$ can be calculated.

3.2.4 Sub-Step s528: Obtaining Complete Model $\mathcal{M}$

The complete model representation $\mathcal{M}$ for $\mathcal{H}_0$ may contain the model representation for the segmented dataset $\mathcal{H}_S$, which is $\mathcal{M}_{\mathcal{H}_S}=\{\mathcal{M}_{\mathcal{H}_i}: i=1, \ldots, I\}$.

If $\mathcal{H}_0$ is a zero-time-delay HR filter dataset, an additional delay model $\mathcal{M}_\tau$ is required. The left onset delay set $\tau_x^l$ and the right onset delay set $\tau_x^r$ or the ITD set $\tau_x^{ITD}$, which is the difference between $\tau_x^l$ and $\tau_x^r$, may be modelled separately as a function of elevation and azimuth angles $(\vartheta, \varphi)$. A model of the set of delays $\tau$ can be represented by $\tau(\vartheta, \varphi; \beta, \mathcal{B})=g(\vartheta, \varphi; \beta, \mathcal{B})$, where g can be a linear or non-linear function with $\beta$ that includes all the model parameters and $\mathcal{B}$ that includes all the basis functions. The basis functions can be learnable or predefined.

As an example, for a linear model, this function may be given by $$\tau(\vartheta, \varphi; \beta, \mathcal{B}) = \sum_{q=1}^{Q} \beta_q \mathcal{B}_q(\vartheta, \varphi),$$

where $\beta_q$ is the model parameter of the q-th basis function $\mathcal{B}_q(\vartheta, \varphi)$. Similar as for the HR filters, the optimal model parameter vector $\hat{\beta}$ may be obtained as the $\beta$ vector that minimizes a loss function of choice. One example of such a loss function is a squared error loss $$\hat{\beta} = \underset{\beta}{\operatorname{argmin}}\left(\sum_m |\tau[m] - \tau(\theta[m], \phi[m]; \beta, \mathcal{B})|^2\right),$$

where $\tau(\theta[m], \phi[m]; \beta, \mathcal{B})$ is the approximation of the delay $\tau[m]$ at the sampled angle $(\theta[m], \phi[m])$ given $\beta$ and $\mathcal{B}$.

The model representation of delay may be denoted by $\mathcal{M}_\tau=\{g, \hat{\beta}, \mathcal{B}\}$ containing the optimal model parameter vector $\hat{\beta}$, the basis functions $\mathcal{B}$, and the modeling function itself g that describes the relationship between $\hat{\beta}$ and $\mathcal{B}$.

Therefore, when applicable, $\mathcal{M}$ may also include the model representations of the onset delay of the left and right HR filters $\mathcal{M}_{\tau_0^l}$ and $\mathcal{M}_{\tau_0^r}$ or the model representation of ITD $\mathcal{M}_{\tau_0^{ITD}}$. $\mathcal{M}$ may be in one of the three forms listed as follows, $$\mathcal{M} = \{\mathcal{M}_{\mathcal{H}_S}\} \text{ or } \mathcal{M} = \{\mathcal{M}_{\mathcal{H}_S}, \mathcal{M}_{\tau_0^l}, \mathcal{M}_{\tau_0^r}\} \text{ or } \mathcal{M} = \{\mathcal{M}_{\mathcal{H}_S}, \mathcal{M}_{\tau_0^{ITD}}\}$$

3.3 Step s506: Output Step

As shown in FIG. 5, in the output step s506, the method 500 may output one or more of the followings based on the given output specification O: (1) the model $\mathcal{M}$ or (2) a new HR filter dataset $\mathcal{H}_M$ generated from the model $\mathcal{M}$ at the desired (D) elevation and azimuth angles $(\theta_D, \phi_D)$ specified in the output specification O.

The new HR filter dataset $\mathcal{H}_M$ may be generated from the model $\mathcal{M}$ at given locations specified by the sequences of desired angles $\{\theta_D, \phi_D\}$, where $\theta_D=\{\theta_D[m]: m=1, \ldots, M_D\}$ and $\phi_D=\{\phi_D[m]: m=1, \ldots, M_D\}$ are specified in the output specification O. Here, $M_D$ is the number of desired angles in the sequences. In some embodiments, $\mathcal{H}_M=\{\theta_0, \phi_0, H_M^l, H_M^r\}$ The HR filters $H_M^l$ and $H_M^r$ may be generated from M through the following two sub-steps.

3.3.1 First Sub-Step: Initializing Empty HR Filter Sets $H_M^l$ and $H_M^r$ $H_M^l=\{h_M^l[m]=[\ ]: m=1, \ldots, M_D\}$ denotes the set of generated left HR filters, where $h_M^l[m]=h_M^l[1; m], \ldots h_M^l[n; m], \ldots, h_M^l[N_M^l; m]$ is an empty vector of length $N_M^l$ and $N_M^l=\Sigma_{i=1}^{I} \mathcal{N}_i^l$. Similarly, $H_M^r=\{h_M^r[m]=[\ ]: m=1, \ldots, M_D\}$ denotes the set of generated right HR filters, where $h_M^r[m]=[h_M^r][1; m], \ldots h_M^r[n; m], \ldots, h_M^r[N_M^r; m]$ is an empty vector of length $N_M^r$ and $N_M^r=\Sigma_{i=1}^{I} \mathcal{N}_i^r$.

3.3.2 Second Sub-Step: Filling the Empty HR Filter Sets $H_M^l$ and $H_M^r$

In some embodiments, the empty HR filter sets $H_M^l$ and $H_M^r$ may be filled via the following processes for each i in $\{1, \ldots, I\}$:

For each m in $\{1, \ldots, M_D\}$:

1st process—Obtaining the spherical angles $\theta_D[m]$ and $\phi_D[m]$ from the sampled angle sequences $\theta_D$ and $\theta_D$.

2nd process—Given the model $\mathcal{M}_{\mathcal{H}_i}$ in $\mathcal{M}$, computing the HR filter taps $\hat{h}_i^l[m]=[\hat{h}_i^l[1; m], \ldots, \hat{h}_i^l[\mathcal{N}_i^l; m]]$ at $(\theta_D[m], \phi_D[m])$ using the modeling function $f_i$, the optimal model parameter $\hat{\alpha}_i^l$ and the basis functions $\mathcal{A}_i$. In the case of a linear model, $\hat{h}_i^l[m]$ is calculated by $\Sigma_{p=1}^{P} \hat{\alpha}_{i,p}^l \mathcal{A}_{i,p}(\theta_D[m], \phi_D[m])$.

3rd process—Assigning $\hat{h}_i^l[m]$ to $[h_M^l[n_i^l[1]; m], \ldots, h_M^l[n][\mathcal{N}_i^l]; m]$.

4th process—Given the model $\mathcal{M}_{\mathcal{H}_i}$ in $\mathcal{M}$, computing the HR filter taps $\hat{h}_i^r[m]=[\hat{h}_i^r[1; m], \ldots, \hat{h}_i^r[\mathcal{N}]; m]$ at $(\theta_D[m], \phi_D[m])$ using the modeling function $f_i$, the optimal model parameter $\hat{\alpha}_i^r$ and the basis functions $\mathcal{A}_i$. In the case of a linear model, $\hat{h}_i^r[m]$ is calculated by $\Sigma_{p=1}^{P} \hat{\alpha}_{i,p}^l \mathcal{A}_{i,p}(\theta_D[m], \phi_D[m])$.

5th process—Assigning $\hat{h}_i^r[m]$ to $[h_M^r][n_i^r[1]; m], \ldots, h_M^r[n_i^r[\mathcal{N}_i^r]; m]$.

Similarly, the steps involved in generating left onset delays $\tau_M^l$ from $\mathcal{M}_{\tau_0^l}$, right onset delays $\tau_M^r$ from $\mathcal{M}_{\tau_0^l}$, or ITDs $\tau_M^{ITD}$ from $\mathcal{M}_{\tau_0^{ITD}}$ are the following:

For each m in $\{1, \ldots, M_D\}$

1st process—Obtaining the spherical angles $\theta_D[m]$ and $\phi_D[m]$ from the sampled angle sequences $\theta_D$ and $\phi_D$.

2nd process—Given the delay set model $\mathcal{M}_\tau$ in $\mathcal{M}$, computing the delay $\hat{\tau}_M[m]$ at $(\theta_D[m], \phi_D[m])$ using the modeling function g, the optimal model parameter $\hat{\beta}$ and the basis functions $\mathcal{B}$. In the case of a linear model, $\hat{\tau}_M[m]$ is calculated by $\Sigma_{q=1}^{Q} \hat{\beta}_q \mathcal{B}_q(\theta[m], \phi[m])$.

Figure 9:
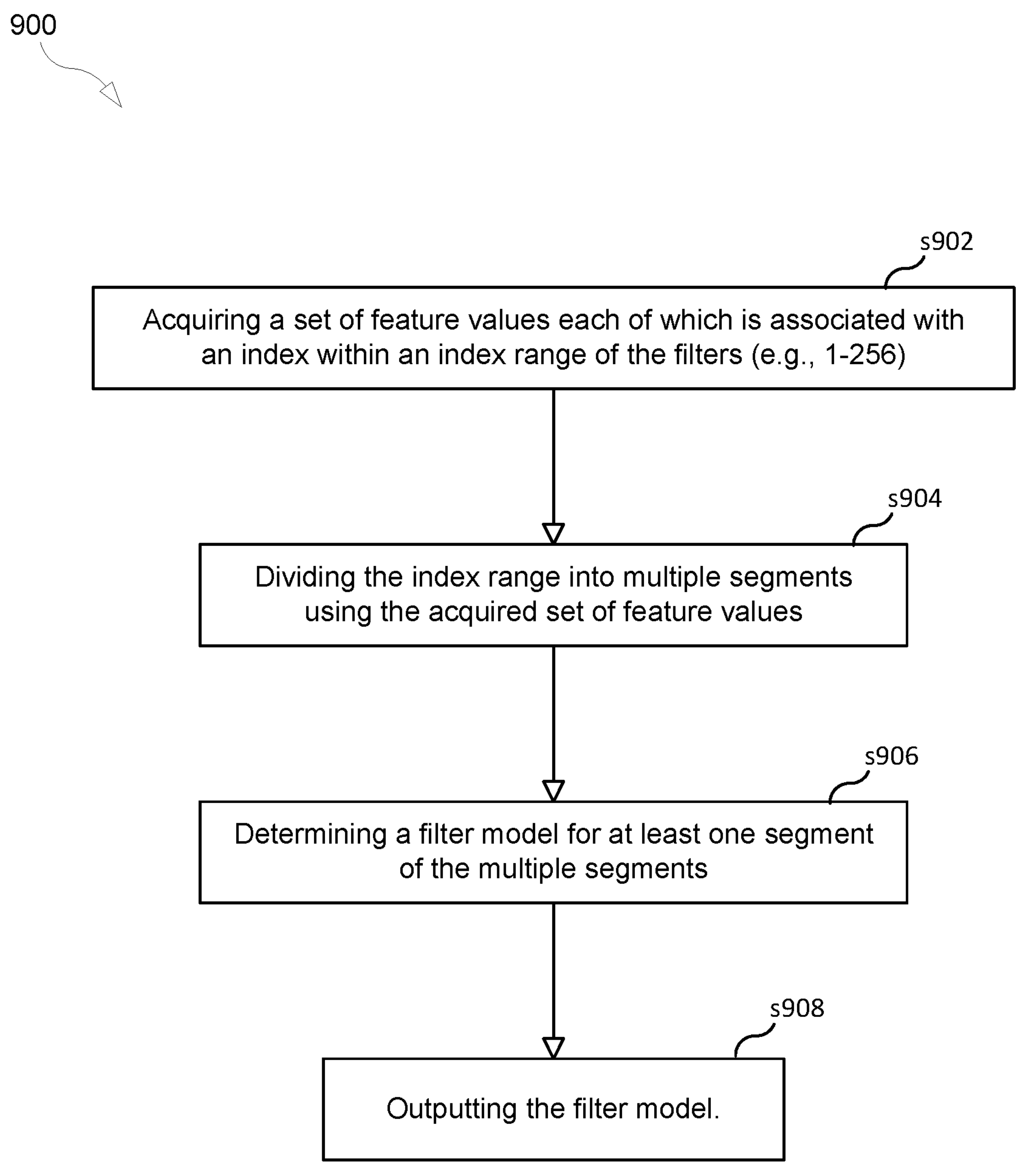
FIG. 9 shows a process according to some embodiments.

FIG. 9 shows a process 900 for modelling of a set of filters. The process 900 may begin with step s902. Step s902 comprises acquiring a set of feature values each of which is associated with an index within an index range of the filters. Step s904 comprises dividing the index range into multiple segments using the acquired set of feature values. Step s906 comprises determining a filter model for at least one segment of the multiple segments. Step s908 comprises outputting the determined filter model.

In some embodiments, the acquiring of the set of feature values comprises calculating a feature value associated with each index included in the index range.

In some embodiments, the feature value associated with each index included in the index range is calculated using a mathematical value associated with filter values obtained at a plurality of sample angles.

In some embodiments, the mathematical value is any one of a mean value of, a maximum value among, a minimum value among, or a variance value of the filter values obtained at a plurality of sample angles.

In some embodiments, dividing the index range into the multiple segments comprises: clustering the feature values into a plurality of clusters, and dividing the index range into the multiple segments using the plurality of clusters.

In some embodiments, dividing the index range into the multiple segments comprises: comparing each feature value included in the set of feature values to a threshold value; and dividing the index range into the multiple segments based on the comparison of each feature value to the threshold value.

In some embodiments, dividing the index range into the multiple segments comprises dividing the index range into a first segment and a second segment, and determining the filter model for said at least one segment comprises determining a first filter model for the first segment and a second filter model for the second segment.

In some embodiments, the first filter model and/or the second filter model is a function of basis functions, and the number of basis functions for the first filter model is different from the number of basis functions for the second filter model.

In some embodiments, the first filter model and/or the second filter model is a function of basis functions, and the order of the basis functions for the first filter model is different from the order of the basis functions for the second filter model.

In some embodiments, the first filter model and/or the second filter model is a function of basis functions, and the order of the basis functions for the first filter model and the order of the basis functions for the second filter model are the same.

In some embodiments, the method further comprises calculating a first variability level for the first segment; and calculating a second variability level for the second segment, wherein the first filter model is determined for the first segment based on the first variability level, and the second filter model is determined for the second segment based on the second variability level.

In some embodiments, the first variability level is determined based on one or more feature values associated with the first segment, and the second variability level is determined based on one or more feature values associated with the second segment.

In some embodiments, the method further comprises obtaining a set of segmented datasets including a first set of segmented dataset and a second set of segmented dataset, wherein the first set of segmented dataset comprises a first set of segmented filter parameters associated with a first segment of the multiple segments, the second set of segmented dataset comprises a second set of segmented filter parameters associated with a second segment of the multiple segments, and the first segment and the second segment do not overlap each other.

In some embodiments, the method further comprises analyzing a distribution of the feature values along the index range; obtaining a feature amount value indicating a particular number of feature values to be included in a particular segment of the index range; and setting the threshold value such that the number of feature values that are greater than or equal to the threshold value is greater than or equal to the feature amount value.

Figure 10:
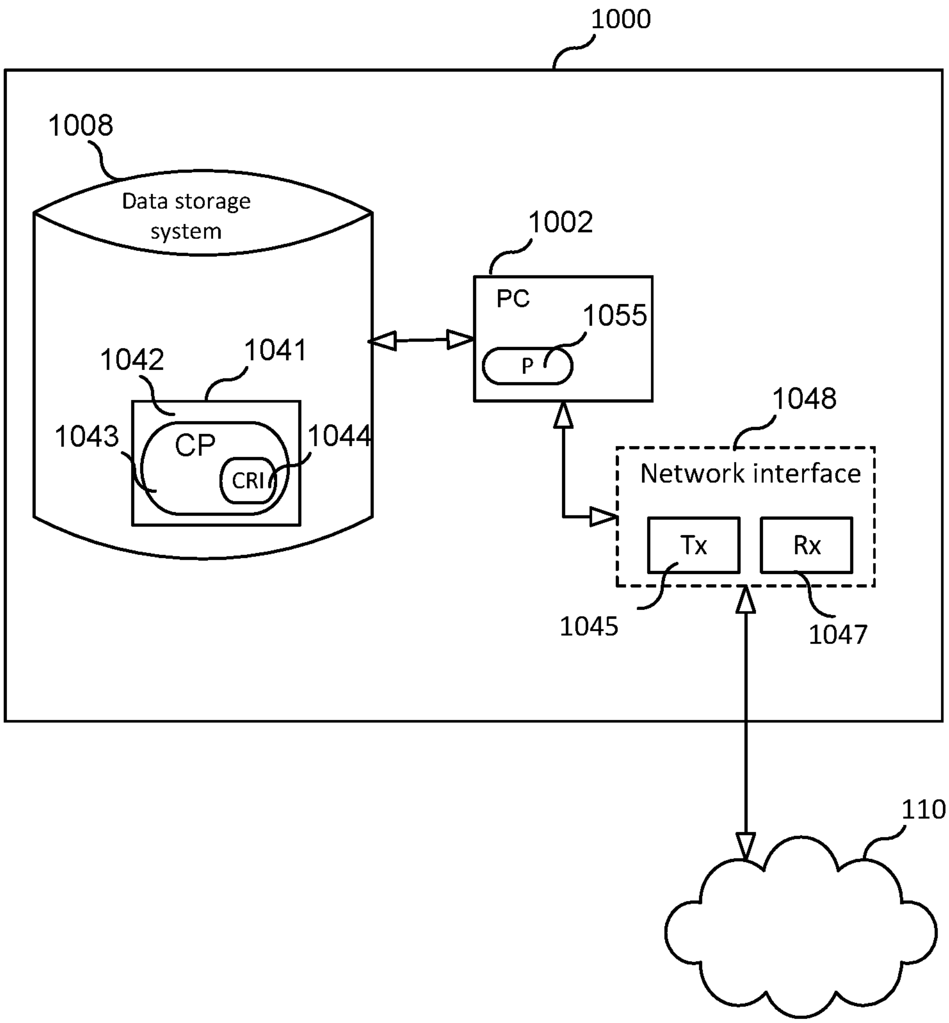
FIG. 10 shows an apparatus according to some embodiments.

FIG. 10 is a block diagram of an apparatus 1000, according to some embodiments, for performing the methods disclosed herein. More specifically, in some embodiments, the filter model provider 1104 shown in FIG. 11 may be implemented at least partially in the form of the apparatus 1000. As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); (optionally) at least one network interface 1048 comprising a transmitter (Tx) 1045 and a receiver (Rx) 1047 for enabling apparatus 1000 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flow charts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

Figure 11:
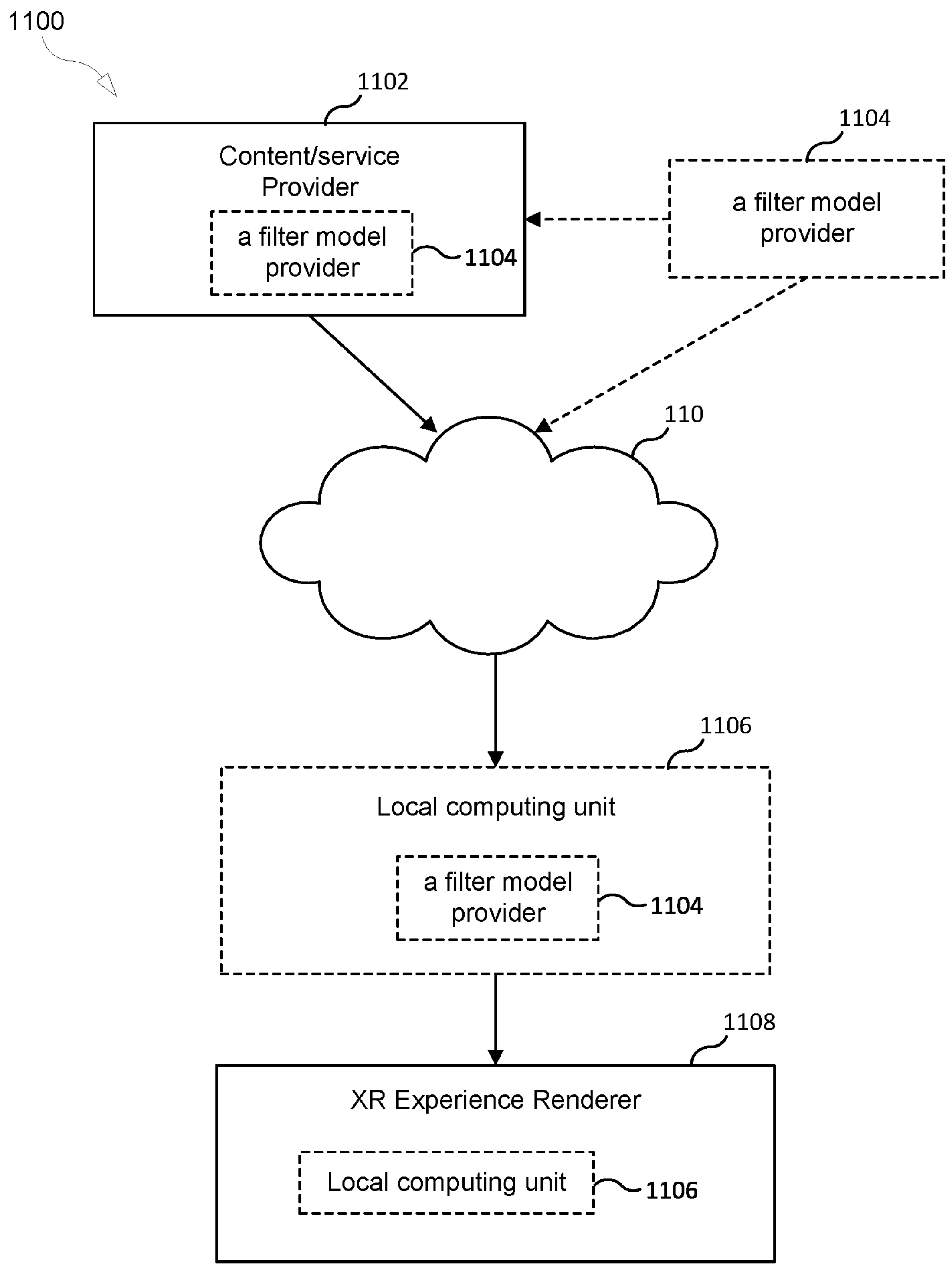
FIG. 11 shows a system according to some embodiments.

FIG. 11 shows a system 1100 for providing an extended reality (XR) (e.g., VR/MR) experience according to some embodiments. The system 1100 may comprise content/service provider (e.g., a server or a group of servers) 1102, a filter model provider (e.g., a server or a group of servers) 1104, local computing unit 1106 (e.g., a personal computer), and XR experience renderer 1108 (e.g., a VR headset). The content/service provider 1102 and the filter model provider 1104 are provided on a server side while the local computing unit 1106 and the XR experience renderer 1108 are provided on a client side.

The filter model provider 1104 may be configured to perform the methods described above (e.g., the methods shown in FIGS. 4, 5, and 9), thereby outputting a set of filters (e.g., a set of HR filters).

In one example, the content/service provider 1102 may be a cloud based gaming service provider providing a VR gaming service to a user via a network 110. To provide more realistic gaming experience, the content/service provider 1102 may want to provide to the XR experience renderer 1108 audio data which may be used to create sound effect as if the user is in the VR environment. Such audio data may allow the user to hear different sounds based on the user's orientation. To provide such audio data, the content/service provider 1102 may send to the filter model provider 1104 a request for a model (e.g., HR filter models) or filters (e.g., HR filters) created from the model. The model may be used to generate (audio) filters which may be used to generate audio that is perceived by the user as if the user is at a particular orientation in the VR environment. Upon receiving the model or the filters, the content/service provider 1102 may send to the local computing unit 1106 via the network 110 the audio data containing the model and the filters.

In some embodiments, instead of receiving the request for the model from the content/service provider 1102, the filter model provider 1104 may receive the request from the user (i.e., the XR experience renderer 1108). In such embodiments, the filter model provider 1104 may send the model or the filters to the user.

The local computing unit 1106 may generate audio data using the received model or the received filters and provide the generated audio data to the XR experience renderer 1108. Upon receiving the audio data from the local computing unit 1106, the XR experience renderer 1108 may produce sound that is to be perceived by the user as if the user is at a particular orientation in the VR environment.

In the above embodiment, the local computing unit 1106 is provided as an entity that is separate from the XR experience renderer 1108. However, in other embodiments, the local computing unit 1106 may be included in the XR experience renderer 1108.

In the above embodiments, the filter model provider 1104 may be an audio data provider specialized in providing spatial audio data and is an entity that is separate and different from the content/service provider 1102 which may be a VR gaming service provider. However, in other embodiments, the filter model provider 1104 and the content/service provider 1102 may be the same entity (e.g., a VR gaming service provider may also provide spatial audio data).

Alternatively, instead of having the filter model provider 1104, the function of the filter model provider 1104—i.e., providing an audio filter model or audio filters—may be implemented in the local computing unit 1106. In other words, the local computing unit 1106 may be capable of generating and storing an audio model or audio filters. The audio model or the audio filters may be used to generate audio perceived by the user as if the user is at a particular orientation in the VR environment.

Figure 12A:
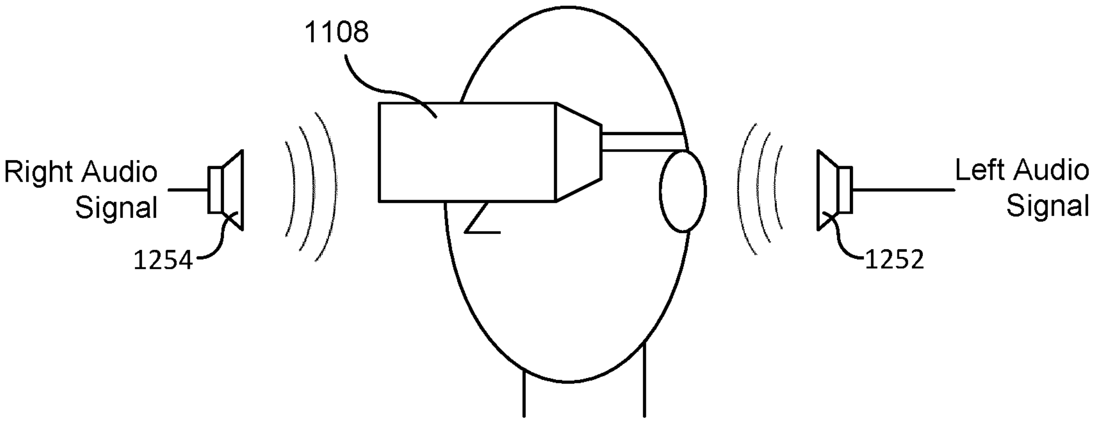
FIGS. 12A and 12B show a system according to some embodiments.
Figure 12B:
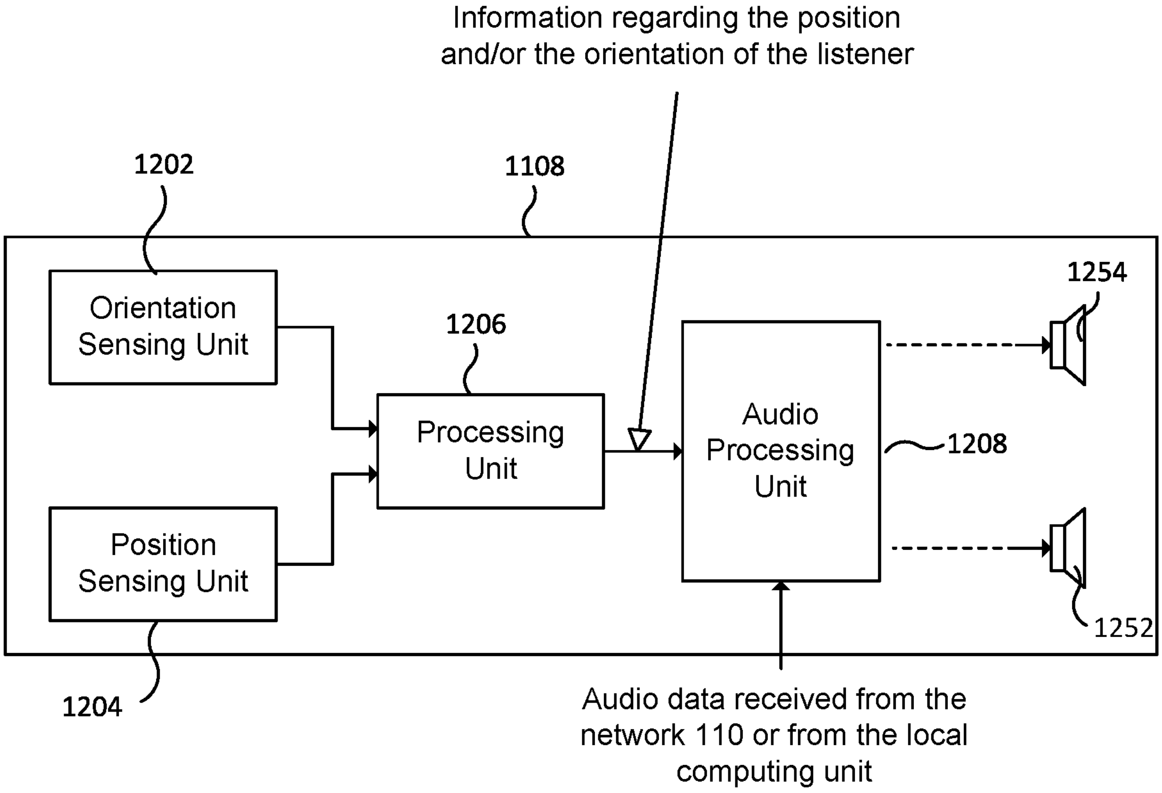

FIGS. 12A and 12B show the XR experience renderer 1108 (including a left speaker 1252 and a right speaker 1254) according to some embodiments. As shown in FIG. 12A, the XR experience renderer 1108 is configured to be worn by a user. As shown in FIG. 12B, the XR experience renderer 1108 may comprise an orientation sensing unit 1202, a position sensing unit 1204, a processing unit 1206, an audio processing unit 1208, and two speakers 1252 and 1254. The orientation sensing unit 1202 is configured to detect a change in the orientation of the listener and provides information regarding the detected change to the processing unit 1206. In some embodiments, the processing unit 1206 determines the absolute orientation (in relation to some coordinate system) given the detected change in orientation detected by orientation sensing unit 1202. There could also be different systems for determination of orientation and position, e.g. a system using lighthouse trackers (lidar). In one embodiment, the orientation sensing unit 1202 may determine the absolute orientation (in relation to some coordinate system) given the detected change in orientation. In this case the processing unit 1206 may simply multiplex the absolute orientation data from orientation sensing unit 1202 and the absolute positional data from position sensing unit 1204. In some embodiments, orientation sensing unit 1202 may comprise one or more accelerometers and/or one or more gyroscopes.

The information regarding the orientation and/or the position of the listener may be provided from the processing unit 1206 to the audio processing unit 1208. Using the audio model or the audio filters included in the audio data (received from the network 110 in the embodiment where the local computing unit 1106 is included in the XR experience renderer 1108 or from the local computing unit 1106 in the embodiment where the local computing unit 1106 is an entity that is separate from the XR experience renderer 1108), the audio processing unit 1208 may generate audio signals for producing sound perceived by the listener as if the listener is at the detected orientation and/or the position in the VR environment. The generated audio signals may be transmitted from the audio processing unit 1208 to the speakers 1252 and 1254, thereby generating sound for the VR environment.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for modelling of a set of filters, the method comprising:
- acquiring a set of feature values each of which is associated with an index within an index range of the filters;
- dividing the index range into multiple segments using the acquired set of feature values;
- determining a filter model for at least one segment of the multiple segments; and
- outputting the determined filter model.

2. The method of claim 1, wherein the acquiring of the set of feature values comprises calculating a feature value associated with each index included in the index range.

3. The method of claim 2, wherein the feature value associated with each index included in the index range is calculated using a mathematical value associated with filter values obtained at a plurality of sample angles.

4. The method of claim 3, wherein the mathematical value is any one of a mean value of, a maximum value among, a minimum value among, or a variance value of the filter values obtained at a plurality of sample angles.

5. The method of claim 1, wherein dividing the index range into the multiple segments comprises:
- clustering the feature values into a plurality of clusters, and dividing the index range into the multiple segments using the plurality of clusters.

6. The method of claim 1, wherein dividing the index range into the multiple segments comprises:

comparing each feature value included in the set of feature values to a threshold value; and dividing the index range into the multiple segments based on the comparison of each feature value to the threshold value.

7. The method of claim 1, wherein dividing the index range into the multiple segments comprises dividing the index range into a first segment and a second segment, and determining the filter model for said at least one segment comprises determining a first filter model for the first segment and a second filter model for the second segment.

8. The method of claim 7, wherein the first filter model and/or the second filter model is a function of basis functions, and the number of basis functions for the first filter model is different from the number of basis functions for the second filter model.

9. The method of claim 7, wherein the first filter model and/or the second filter model is a function of basis functions, and the order of the basis functions for the first filter model is different from the order of the basis functions for the second filter model.

10. The method of claim 7, wherein the first filter model and/or the second filter model is a function of basis functions, and the order of the basis functions for the first filter model and the order of the basis functions for the second filter model are the same.

11. The method of claim 7, the method further comprising:

calculating a first variability level for the first segment; and calculating a second variability level for the second segment, wherein the first filter model is determined for the first segment based on the first variability level, and the second filter model is determined for the second segment based on the second variability level.

12. The method of claim 11, wherein the first variability level is determined based on one or more feature values associated with the first segment, and the second variability level is determined based on one or more feature values associated with the second segment.

13. The method of claim 1, the method further comprising:

obtaining a set of segmented datasets including a first set of segmented dataset and a second set of segmented dataset, wherein the first set of segmented dataset comprises a first set of segmented filter parameters associated with a first segment of the multiple segments, the second set of segmented dataset comprises a second set of segmented filter parameters associated with a second segment of the multiple segments, and the first segment and the second segment do not overlap each other.

14. The method of claim 6, the method further comprising:

analyzing a distribution of the feature values along the index range;

obtaining a feature amount value indicating a particular number of feature values to be included in a particular segment of the index range; and setting the threshold value such that the number of feature values that are greater than or equal to the threshold value is greater than or equal to the feature amount value.

15. An apparatus for modelling of a set of filters, the apparatus comprising:

a memory; and processing circuitry coupled to the memory, wherein the apparatus is configured to:

acquire a set of feature values each of which is associated with an index within an index range of the filters;

divide the index range into multiple segments using the acquired set of feature values;

determine a filter model for at least one segment of the multiple segments; and output the determined filter model.

16. A non-transitory computer readable storage medium storing a computer program for modelling a set of filters, the computer program comprising computer code which, when run on processing circuitry of an apparatus, causes the apparatus to:

acquire a set of feature values each of which is associated with an index within an index range of the filters;

divide the index range into multiple segments using the acquired set of feature values;

determine a filter model for at least one segment of the multiple segments; and output the determined filter model.

* * * * *